United States Patent         (10) Patent No.: US 12,443,657 B2
Vaduvatha et al.              (45) Date of Patent:      Oct. 14, 2025

(54) HIGH BANDWIDTH CONTENT ADDRESSABLE MEMORY (CAM) BASED HARDWARE ARCHITECTURE FOR DATACENTER NETWORKING

(71) Applicant: Google LLC, Mountain View, CA (US)

(72) Inventors: Srinivas Vaduvatha, San Jose, CA (US); Weihuang Wang, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 491 days.

(21) Appl. No.: 17/547,334

(22) Filed: Dec. 10, 2021

(65) Prior Publication Data

US 2022/0382783 A1    Dec. 1, 2022

Related U.S. Application Data

(60) Provisional application No. 63/192,626, filed on May 25, 2021.

(51) Int. Cl.
*G06F 16/901* (2019.01)
*H04L 45/745* (2022.01)

(52) U.S. Cl.
CPC .... *G06F 16/9017* (2019.01); *H04L 45/74591* (2022.05)

(58) Field of Classification Search
None
See application file for complete search history.

(56) References Cited

U.S. PATENT DOCUMENTS

| 6,324,087 | B1 | 11/2001 | Pereira |
| 6,473,846 | B1 | 10/2002 | Melchior |
| 7,058,757 | B1 | 6/2006 | Branth et al. |
| 7,193,876 | B1 | 3/2007 | Park et al. |
| 7,219,188 | B1 | 5/2007 | Pereira |
| 7,240,041 | B2 | 7/2007 | Martin et al. |

(Continued)

FOREIGN PATENT DOCUMENTS

| CN | 110191057 A | 8/2019 |
| CN | 112383622 A | 2/2021 |

OTHER PUBLICATIONS

Extended European Search Report for European Patent Application No. 22156875.1 dated Jul. 1, 2022. 11 pages.
(Continued)

*Primary Examiner* — Luna Weissberger
(74) *Attorney, Agent, or Firm* — Lerner David LLP

(57) ABSTRACT

A communication protocol system is provided for reliable transport of packets. A content addressable memory hardware architecture including a reorder engine and a retransmission engine may be utilized for the reliable transport of the packets. The content addressable memory module includes a primary CAM that may be logically partitioned into a plurality of physical sub-CAMs. One or more processors are in communication with the content addressable memory module. The one or more processors receive a set of data packets. A lookup operation is performed by the one or more processors to access data entries stored in each of the sub-content addressable memories. An update operation is performed by the one or more processors at a selected sub-content addressable memory from the plurality of the sub-content addressable memories.

20 Claims, 14 Drawing Sheets

(56) References Cited

U.S. PATENT DOCUMENTS

| | | | |
|---|---|---|---|
| 7,305,486 | B2 | 12/2007 | Ghose et al. |
| 7,337,267 | B1* | 2/2008 | Pereira ............... G11C 15/00 |
| | | | 365/49.1 |
| 7,571,278 | B2 | 8/2009 | Anthony, Jr. et al. |
| 7,817,634 | B2 | 10/2010 | Coffman et al. |
| 7,822,916 | B1 | 10/2010 | Wen |
| 7,870,217 | B2 | 1/2011 | Pandya |
| 8,549,170 | B2 | 10/2013 | Minami et al. |
| 8,610,086 | B2 | 12/2013 | Wolleschensky et al. |
| 11,375,006 | B1* | 6/2022 | Shivanna ............ H04L 41/5051 |
| 2004/0030770 | A1 | 2/2004 | Pandya |
| 2004/0049612 | A1 | 3/2004 | Boyd et al. |
| 2004/0165588 | A1 | 8/2004 | Pandya |
| 2006/0274787 | A1 | 12/2006 | Pong |
| 2008/0313364 | A1 | 12/2008 | Flynn et al. |
| 2014/0201318 | A1 | 7/2014 | Dajani et al. |
| 2014/0286072 | A1* | 9/2014 | Lauer ................ G11C 15/00 |
| | | | 365/49.17 |
| 2017/0187598 | A1 | 6/2017 | Andreyev et al. |
| 2018/0102975 | A1 | 4/2018 | Rankin |
| 2019/0007315 | A1 | 1/2019 | Shoham et al. |
| 2019/0190542 | A1 | 6/2019 | Wang et al. |
| 2020/0314030 | A1 | 10/2020 | Goel et al. |
| 2021/0067448 | A1* | 3/2021 | Remen ............. H04L 45/74591 |
| 2021/0089450 | A1 | 3/2021 | Simionescu et al. |
| 2021/0185139 | A1 | 6/2021 | Wang et al. |

OTHER PUBLICATIONS

Extended European Search Report for European Patent Application No. 21155513.1 dated Jul. 30, 2021. 9 pages.

Montazeri, Behnam et al. "Homa: A Receiver-Driven Low-Latency Transport Protocol Using Network Priorities." SIGCOMM '18, Aug. 20-25, 2018, Budapest, Hungary. pp. 221-235.

Rajiullah, Mohammad. "Towards a Low Latency Internet: Understanding and Solutions." Sep. 2015. Dissertation. Department of Computer Science, Karlstad University, Sweden. 58 pages.

Vernersson, Andreas. "Analysis of UDP-based Reliable Transport using Network Emulation." 2015. Master's Thesis. Master of Science in Engineering Technology Computer Science and Engineering. Luleå University of Technology. 93 pages.

Wu, Haitao et al. "ICTCP: Incast Congestion Control for TCP in Data-Center Networks." IEEE/ACM Transactions on Networking, vol. 21, No. 2, Apr. 2013. pp. 345-358.

* cited by examiner

HIGH BANDWIDTH CONTENT ADDRESSABLE MEMORY (CAM) BASED HARDWARE ARCHITECTURE FOR DATACENTER NETWORKING

CROSS-REFERENCE TO RELATED APPLICATIONS

The present application claims the benefit of the filing date of U.S. Provisional Patent Application No. 63/192,626 filed May 25, 2021, the disclosure of which is hereby incorporated herein by reference.

BACKGROUND

The internet protocol suite is a set of communication protocols used for servicing data transmissions between two devices communicating information over a network. A packet is one form of data in which encapsulated data can be transmitted through networks based on control information that is stored in a head portion, such as a header, of the packet. Generally, if sequence numbers of the packets monotonically increase, it indicates the data flows through the network without loss. However, in some situations when multiple synchronized computing devices send data to a same receiver computing device in parallel, it often results in congestion, which undesirably slows down the data transmission speed as well as increasing the likelihood of data loss or data out of order.

Further, when a stream of packets is transmitted from the sending computing device to the receiving computing device, due to the number of different paths and other factors, such as unexpected delay or equipment failure, the transmitted packets may also often arrive out of sequence or out of order at the receiving computing device. For example, one or more subsequent data packets in a sequence may be routed through a different, faster path than earlier data packets causing the sequence to be out of order. Alternatively, a data packet, or packets may be held at a device on the network for additional processing or may transmit in a slower queue in a network device causing later sequenced data packets to be sent ahead of earlier packets. Thus, a reorder or resequencing of the transmitted packet is often desired during or after the transmission is completed. In some examples, the transmitted packets may not be received by the receiving computing device within a timeout period, such as a data packet loss. In such examples, a retransmission may be needed. Such reorder, resequencing, or retransmission of the data packets often requires the sending computing device or the receiving computing device to perform a lookup operation and/or an update operation to determine the content to be retransmitted or reordered. However, such operations often result in lookup latency, undesirably delaying the transmission performance of the data packets.

BRIEF SUMMARY

The present disclosure provides a communication protocol system for reliable transport of packets. A content addressable memory hardware architecture including a reorder engine and a retransmission engine may be utilized for the reliable transport of the packets. In this regard, the content addressable memory module is configured to be implemented in a reorder engine or a retransmission engine in a computing system. The content addressable memory module includes a plurality of sub-content addressable memories logically partitioned from a primary content addressable memory in the computing system. A plurality of searchable first-in first out (FIFO) interfaces is configured to be in communication with respective sub-content addressable memories from the plurality of sub-content addressable memories. One or more processors are in communication with the content addressable memory module. The one or more processors are configured to receive a set of data packets, perform a lookup operation to access data entries stored in each of the sub-content addressable memories, and perform an update operation at a selected sub-content addressable memory from the plurality of the sub-content addressable memories.

In one example, the content addressable memory module of further includes a result merge module in communication with the plurality of the sub-content addressable memories. The result merge module is configured to receive search results from each of the sub-content addressable memories after the lookup operation. The FIFO interface is configured to perform the lookup operation and the update operation synchronously.

In one example, when performing the lookup operation, the one or more processors are configured to compare the set of the data packets with the data entries in each of the sub-content addressable memories and determine whether a data match is found between the set of the data packet and the data entries in the sub-content addressable memories. The one or more processors are further configured to perform an uninstall process during the update operation when the data match is found. The one or more processors are further configured to perform an install process during the update operation when no data match is found. The set of data packets comprises one or more push grant, push unsolicited data, pull response, pull request, or acknowledgment.

The present disclosure provides a method. The method includes receiving, by one or more processors, a set of data packets from an input operation in a computing system, performing, by the one or more processors, a first lookup operation to access data entries stored in a plurality of sub-content addressable memories logically partitioned from a primary content addressable memory in a content addressable memory module, and performing, by the one or more processors, an update operation at a selected sub-content addressable memory from the plurality of the sub-content addressable memories.

The method further includes performing, by the one or more processors, a second lookup operation in the plurality of sub-content addressable memories while performing the update operation in the selected sub-content addressable memory. The performing of the first lookup operation further includes transmitting the set of data packets through a plurality of FIFO interfaces in communication with the plurality of sub-content addressable memories, each FIFO configured to be in communication with a respective sub-content addressable memory and comparing the set of data packets with the data entries stored in each of the sub-content addressable memories.

The method further includes transmitting each preliminary search result from each of the sub-content addressable memories to a result merger module in the content addressable memory module and generating a final search result in the result merger module. The transmitting of each preliminary search result further includes processing each preliminary search result from each of the sub-content addressable memories in a corresponding first merge stage module in the result merger module and transmitting processed preliminary search results from each of the first merge stage modules in a second merge stage module to generate the final search result.

The method further includes determining if a data match is found between the set of the data packet with the data entries in the sub-content addressable memory. The method further includes performing an uninstall process during the update operation when the data match is found. The method further includes performing an install process during the update operation when no data match is found. The FIFO interfaces are configured to perform the lookup operation and the update operation synchronously. In one example, the set of data packets comprises one or more push grant, push unsolicited data, pull request, pull response or acknowledgment. The input operation is a Remote Direct Memory Access (RDMA) operation.

The present disclosure further provides a method. The method includes performing, by one or more processors, a lookup operation and an update operation synchronously in a plurality of sub-content addressable memories logically partitioned from a primary content addressable memory in a content addressable memory module.

DETAILED DESCRIPTION

The technology generally relates to communication protocols for reliable transport (RT) of packets over a connection. A content addressable memory (CAM) based hardware architecture is utilized in the reliable transport (RT). The content addressable memory (CAM) is a memory that is addressable by content and provides a storage array random access memory (RAM). The content addressable memory may save an array of data entries and provide a look-up table, such as a look-up key, for performing a lookup operation. The lookup operation may facilitate comparing an incoming array of data entries with the array of data entries stored in the CAM to determine if an update operation, such as install/uninstall operations, are required. In one example, a primary content addressable memory in the reorder engine and/or retransmission engine may be logically partitioned to include a plurality of sub-content addressable memories. As a result, the update operations may be performed in parallel in each sub-content addressable memory without compromising the lookup latency. The primary CAM may logically arrange the update operations across the plurality of sub-content addressable memories, thereby increasing the probability of executing parallel update operations as well as lookup operations. As such, the overall CAM bandwidth and performance is enhanced.

Figure 1:
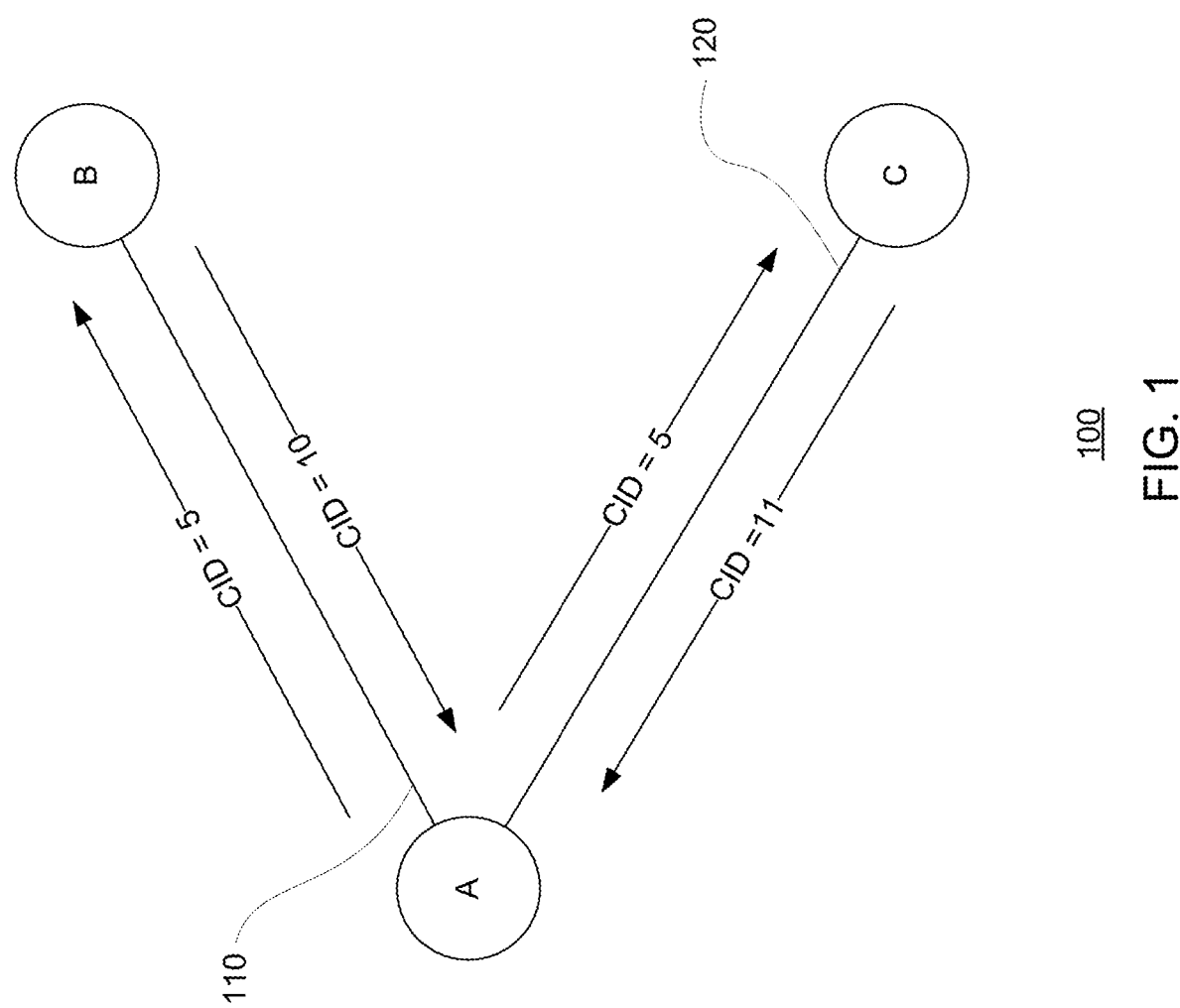
FIG. 1 is a schematic diagram of a network according to aspects of the disclosure.

FIG. 1 shows an example network 100. The network 100 includes various entities, such as entity A, entity B, and entity C. In order to communicate with one another, connections are formed between the entities, such as connection 110 between entities A and B, and connection 120 between entities A and C. The entities may communicate over the connections using one or more protocols. For example, a reliable transport (RT) protocol is a protocol which notifies the sender whether or not the delivery of data to an intended receiver was successful. A sender and a receiver are considered peers of a communication protocol, thus entities A and B may be reliable transport peers, and entities A and C may be reliable transport peers. A connection over which reliable transport protocol is used is an end-to-end construct that describes a bidirectional communication channel between two reliable transport peers.

A connection may be identified by a pair of Connection IDs ("CIDs"), one in each direction of communication. CIDs may be allocated by a receiver entity during connection setup process and have no global significance outside of the parties involved. In the example shown, the connection 110 between entities A and B has a CID with value 5 for the direction from A to B, and a CID with value 10 for the direction from B to A. The connection 120 between entities A and C has a CID value 5 for the direction from A to C and a CID with value 11 for the direction from C to A. In other examples, CIDs may be assigned by a source entity. Such "Source CIDs" may have different values assigned to different receiver entities. Thus, in the example shown, the CIDs or Source CIDs assigned by entity A between the connection of entity A and B have different values 10 and 11. In contrast, "Destination CIDs" of an entity are assigned by other entities and may have the same value. Thus, in the example shown, the Destination CIDs of entity A are assigned by entities B and C respectively, which may have the same value 5.

Packets may be transmitted over the connections between the entities. In this regard, a packet is a basic unit of communication across a connection. A packet may have a predetermined size, for example up to a maximum transfer unit ("MTU") in length. A packet may have a header including information about the packet and its transmission, and a payload of data. To ensure reliable transport, a reliable transport packet may include the Destination CID, such as in a header. For example, when entity B receives a packet over the connection 110 with the Destination CID of 5, entity B may identify the packet as coming from entity A, and may then notify A that the packet has been received by sending an acknowledgment over the connection 110 referencing this packet and its CID of 5. The acknowledgment itself may be sent as a packet including the Destination CID of 5.

Figure 2:
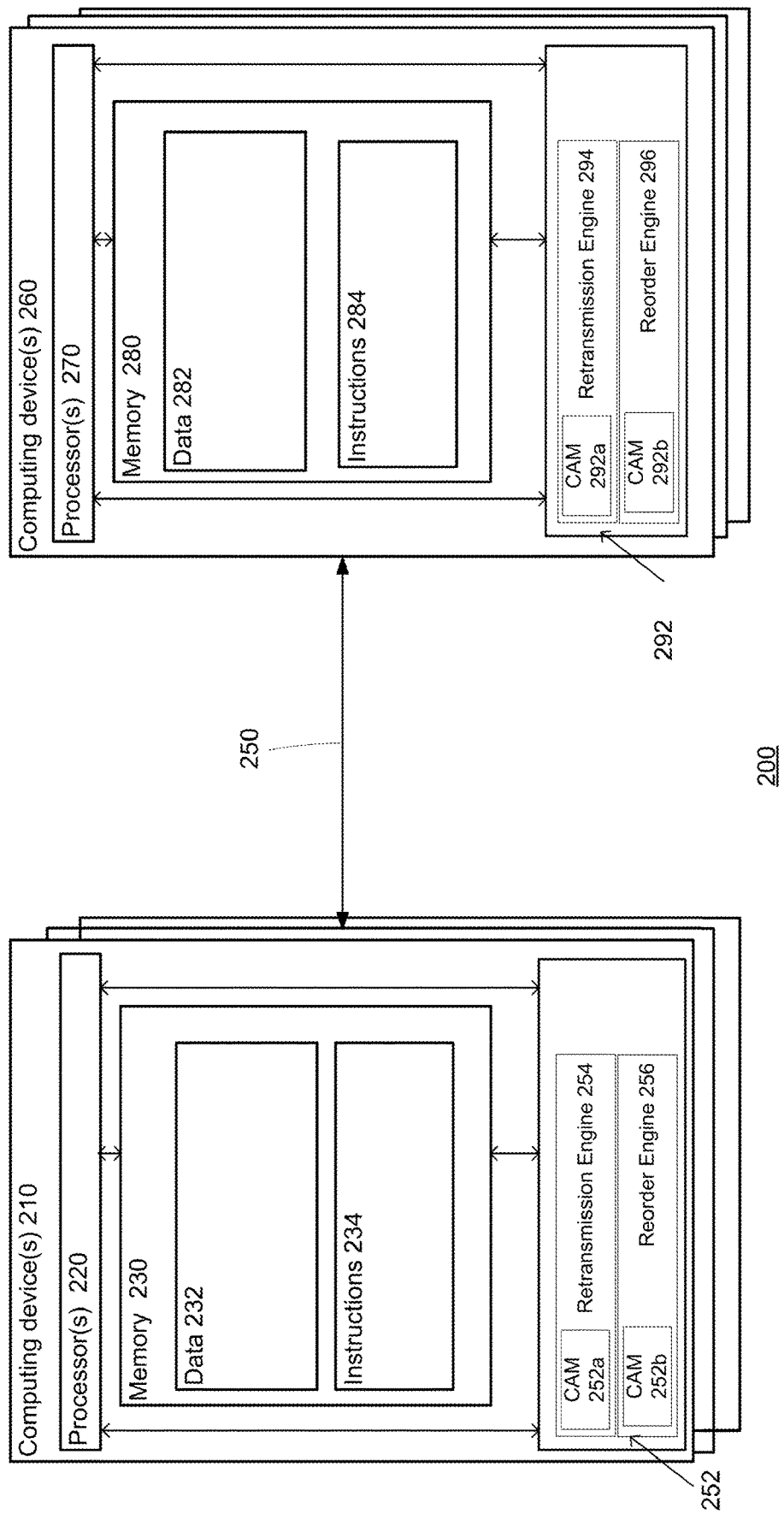
FIG. 2 is a block diagram of an example system according to aspects of the disclosure.

Entities A, B, and C may be any type of device capable of communicating over a network, such as personal computing devices, server computing devices, mobile devices, wearable devices, virtual machines, etc. FIG. 2 is a block diagram of some components in an example system 200 that can communicate using a reliable transport protocol. The system 200 includes at least two entities having one or more connections between them. It should not be considered as limiting the scope of the disclosure or usefulness of the features described herein. In this example, the system 200 is shown with two entities, one or more computing devices 210 and one or more computing devices 260, with a connection 250 between them. For example, computing devices 210 may be entity A and computing devices may be entity B of FIG. 1, and connection 250 may be connection 110 of FIG. 1. The computing devices 210 and 260 may be configured with similar components as shown, or may include additional and/or different components. In the example shown, the computing devices 210 contain one or more processors 220 and memory 230.

The one or more processors 220 can be any conventional processors, such as a commercially available CPU. Alternatively, the processors can be dedicated components such as an application specific integrated circuit ("ASIC") or other hardware-based processor. Although not necessary, the one or more of the computing devices 210 may include specialized hardware components to perform specific computing processes.

The memory 230 can be of any non-transitory type capable of storing information accessible by the processor, such as a hard-drive, memory card, ROM, RAM, DVD, CD-ROM, write-capable, and read-only memories. Memory 230 of the computing devices 210 can store information accessible by the one or more processors 220, including data 232 and instructions 234.

Memory 230 can include data 232 that can be retrieved, manipulated or stored by the processors 220. For example, data such as communication protocols, connection information such as CIDs, definitions of headers, etc., as described with respect to FIG. 1 and FIG. 3-13 may be retrieved, manipulated, or stored by the processors 220.

Memory 230 of the computing devices 210 can also store instructions 234 that can be executed by the one or more processors 220. For example, instructions such as communication protocols as described with reference to FIGS. 1 and 3-13 may be performed by the one or more processors 220 according to instructions 234 and data 232 in memory 230.

Data 232 may be retrieved, stored, or modified by the one or more processors 220 in accordance with the instructions 234. For example, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

A content addressable memory (CAM) 252, 292 (shown as 252a, 252b, 292a, 292b) may be installed in one or both of the computing devices 210, 260. The content addressable memory 252, 292 may provide a look-up table that allows the processors 220, 270 to mark, order, classify, and identify the packets and data transmitted between the computing devices 210, 260 and store such information in the look-up table configured in the content addressable memory 252, 292. A retransmission engine 254, 294 and a reorder engine 256, 296 utilize the content addressable memory (CAM) 252, 292 to perform the look-up operation or retransmission operation so as to assist reordering and/or retransmitting packets or data when data or packets are lost, out-of-order or missing during transmission. After the packets are reordered and retransmitted, the data entries in the look-up table may be updated, installed or uninstalled based on the data transactions as performed.

Based on the look-up table registered in the content addressable memory (CAM) 252, 292, data sequencing and transmission content may be easily stored and compared. Thus, when the packets are lost or out of order during transmission that requires reassemble, reorder, or retransmit, the content addressable memory (CAM) 252, 292 may assist identifying the missing or out-of-order information to request for data retransmission or data reordering. When identified, the data entries in the content addressable memory (CAM) 252, 292 may be required to be updated, installed or uninstalled. For example, when a data packet is requested to be retransmitted, the new packet being transmitted may include a new assigned sequence number. Thus, the data entries registered in the content addressable memory (CAM) 252, 292 may be required to be updated or installed. When a data transmission is completed, the data entries may be removed or uninstalled in the content addressable memory (CAM) 252, 292.

Although not shown, computing devices 210 may further include other components typically present in general purpose computing devices. For example, computing devices 210 may include output devices, such as displays (e.g., a monitor having a screen, a touch-screen, a projector, a television, or other device that is operable to display information), speakers, haptics, etc. The computing devices 210 may also include user input devices, such as a mouse, keyboard, touch-screen, microphones, sensors, etc.

Although FIG. 2 functionally illustrates the processor, memory, and other elements of computing devices 210 as being within the same block, the processor, computing device, or memory can actually comprise multiple processors, computers, computing devices, or memories that may or may not be stored within the same physical housing. For example, the memory can be a hard drive or other storage media located in housings different from that of the computing devices 210. Accordingly, references to a processor, computer, computing device, or memory will be understood to include references to a collection of processors, computers, computing devices, or memories that may or may not operate in parallel. For example, the computing devices 210 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 210 may be capable of directly and indirectly communicating with other entities, such as computing devices 260, of a network through connection 250.

Computing devices 210 and 260 may be interconnected using various protocols and systems, such that computing devices in the network can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 3:
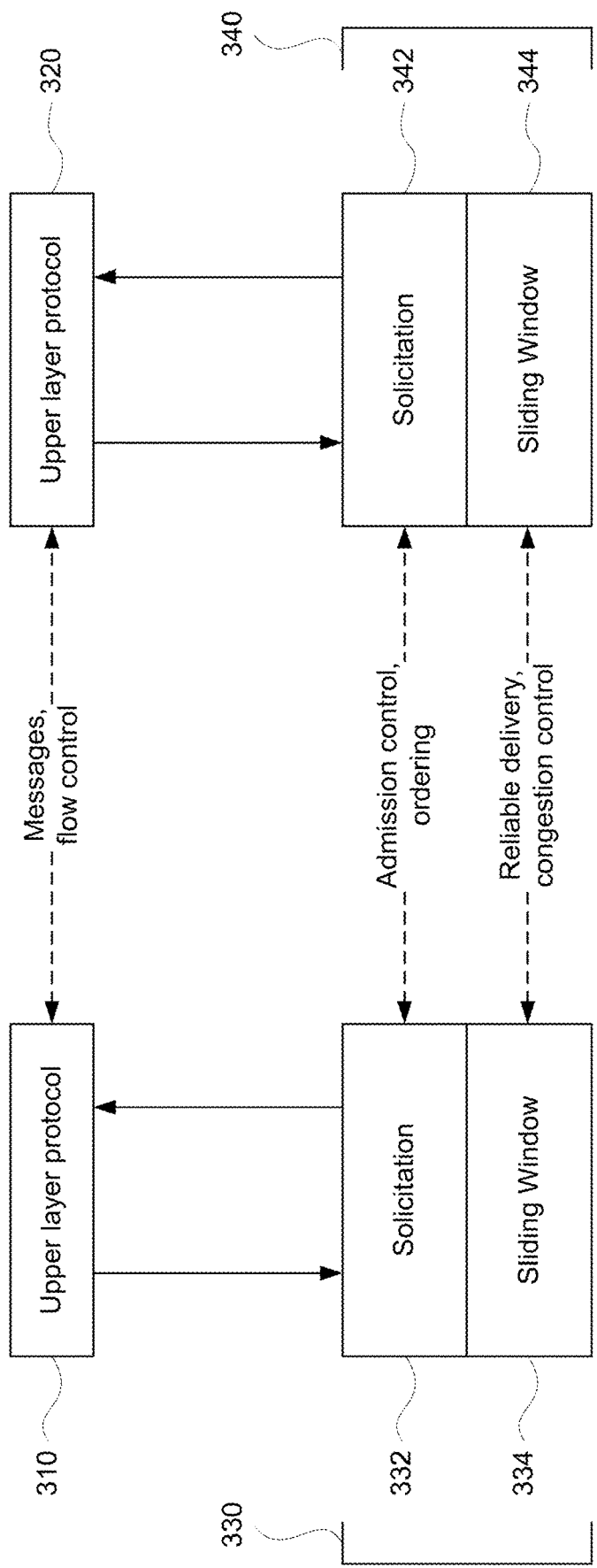
FIG. 3 is a block diagram of communication layers according to aspects of the disclosure.

Returning to FIG. 1, packets may be transmitted between the entities A, B, and/or C over the connections using one or more communication protocols. FIG. 3 shows an example communication protocol system 300. The communication protocol system 300 may be implemented on two or more entities in a network, such as two or more of entities A, B, C of network 100 of FIG. 1, for example by processors 220 and 270 of FIG. 2. As shown, each entity may include multiple layers of communication protocols. For example, entity A may include upper layer protocol ("ULP") 310 and reliable transport ("RT") protocol 330, and entity B may include upper layer protocol 320 and reliable transport protocol layer 340. Peers may be formed between protocols of each layer. Thus, ULP 310 and ULP 320 are ULP peers, and reliable transport protocol layer 330 and reliable transport protocol layer 340 are RT peers. Further as shown, within each entity, the upper layer protocols are configured to communicate with the reliable transport protocols.

As described with reference to FIG. 4-13, the upper layer protocols 310, 320 may be responsible for implementing the hardware/software interface, processing of messages, completion notifications, and/or end-to-end flow control. The upper layer protocols may be implemented on a number of hardware or software devices. For example, the upper layer protocols may be implemented as Remote Direct Memory Access ("RDMA") operation. As another example, the upper layer protocols may be implemented as a Non-Volatile Memory Express ("NVMe").

Also described with reference to FIG. 4-13, the reliable transport protocols 330, 340 may be responsible for reliable delivery of packets, congestion control, admission control, and/or ordered or unordered delivery of packets. Each reliable transport protocols 330, 340 may logically be partitioned into two sublayers of protocols. Thus, as shown, reliable transport protocol layer 330 is partitioned into a solicitation sublayer 332 that is responsible for end-point admission control and optionally ordered delivery of packets, and a sliding window sublayer 334 that is responsible for end-to-end reliable delivery and congestion control. Likewise, reliable transport protocol layer 340 is also divided into a solicitation sublayer 342 and a sliding window sublayer 344.

Figure 4:
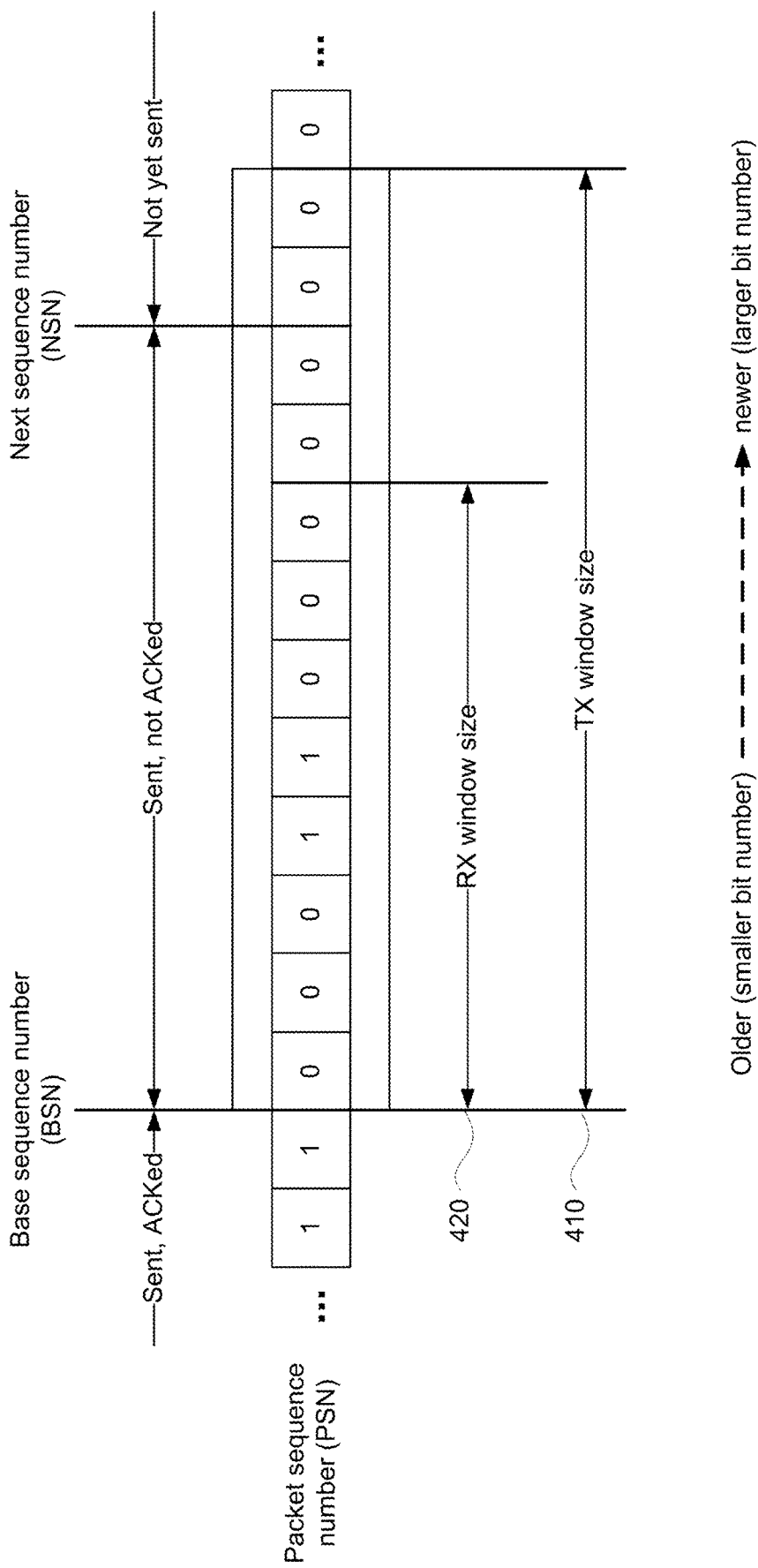
FIG. 4 illustrates an example sliding window according to aspects of the disclosure.

FIG. 4 shows example sliding windows 410 and 420 for data packet transmission control between a transmitter entity and a receiver entity. The sliding windows 410 and 420 are used by entities to keep track of a predetermined number of data packets to be transmitted and acknowledged at a predetermined time frame over a connection. For example, entity A may use the TX sliding window 410 for keeping track of packets sent to the entity B over the connection 110. Entity B may use the RX sliding window 420 for keeping track of packets received from the entity B. In some examples, delays may occur between the TX sliding window 410 and RX sliding window 420 due to network latency. As a result, the TX sliding window 410 and RX sliding window 420 may go out-of-sync temporarily as the network out-of-order and/or loss. As such, the sliding windows 410 and 420 may be respectively implemented in the sliding window sublayer 334 that is part of the reliable transport protocol layer 330 of FIG. 3. The TX sliding window and the RX sliding window may have different sizes as shown, or may alternatively have the same size.

Referring to the TX sliding window 410, to keep track of the packets, each packet is assigned a Packet Sequence Number ("PSN") by the sender entity A. As shown, the bit number increases from left to right. The receiver entity B may acknowledge the packets it has received within the sliding window by communicating to the sender entity A the PSN it has received within the window in an acknowledgment packet. In this regard, a Sequence Number Bitmap (SNB) may be provided on both the sender entity A and the receiver entity B. Each bit of the Sequence Number Bitmap (SNB) represents one packet within a sliding window at the entity. For example, for the TX sliding window 410, a bit is set to 1 if a sent packet has been acknowledged. Otherwise, the bit is 0. Once all packets within the TX sliding window 410 are received and acknowledged, the sender entity A may move the sliding window 410 forward to the next set of packets to be transmitted. The sliding window moves forward once the base sequence number (BSN) packet is acknowledged. Thus, referring to the example in FIG. 4, the sliding window moves by one once the left most 0 is marked, and moves by another one once the second-left-most 0 is marked, and by three once the third 0 is marked (since the two following bits are already set).

PSN for the sender entity may include Base Sequence Number ("BSN") and Next Sequence Number ("NSN"). As shown, BSN is the PSN value of the oldest packet that is yet to be acknowledged by the receiver entity B. Further as shown, NSN is the PSN value that should be assigned to the next packet transmitted over the connection to receiver entity B. For instance, when a packet is received from ULP 310 for transmission, the current PSN may be updated to NSN. Then when the packet is transmitted over the connection, NSN may be incremented, for example with NSN=(NSN+1) mod $2^{32}$. As such, within the sliding window 410, Bit 0 represents a PSN value of BSN and Bit n represents a PSN value of (BSN+n).

Although not shown, the receiver entity may also keep one or more sliding windows. For example, a RX sliding window may be kept by receiver entity B for the packets received, where each bit represents a packet to be received with the sliding window. The bit is set to 1 if the packet has been received by the receiver entity B. Otherwise, the bit is 0. The receiver entity B may also use PSN to keep track of received packets. For instance, BSN may be the PSN value of the oldest packet that is yet to be received by the receiver entity. When a packet is received with a PSN value of BSN, the BSN may be updated to the next lowest PSN of the packet that has not yet been received, for example with BSN=(BSN+1) mod $2^{32}$. The update of the BSN may clear the bits in the Sequence Number Bitmap corresponding to packets from the previous BSN to the PSN. As such, within the RX sliding window for the receiver entity B, Bit 0 represents a PSN value of BSN and Bit n represents a PSN value of (BSN+n). Because sender entity A does not acknowledge the acknowledgments sent by receiver entity B, that is, PSN is not used for the acknowledgment packets, the receiver entity B need not keep a TX sliding window for the acknowledgments it sends.

The sender entity and receiver entity may handle the packets and the respective acknowledgments according to a set of rules. For instance, if the receiver BSN in a received packet is smaller than the sender entity's BSN, the sender entity discards the ACK information; otherwise, the sender entity updates its BSN to match the receiver entity's BSN. After adjusting its BSN, the sender entity applies an OR operation on the receiver entity's Sequence Number Bitmap in the ACK packet with its own Sequence Number Bitmap. After a packet is transmitted, it is buffered by the sender entity until it is acknowledged by the receiver entity. With respect to retransmission of failed packets, the sender entity may be configured to free up resources allocated to all ACK packets in a retransmit buffer. Further, upon per packet retransmit timer expiry, the sender entity retransmits the packet with the same PSN as the original packet and increments a retransmission counter for that packet.

The receiver entity may also implement a number of rules. For instance, if the PSN value of the received packet is less than the BSN of the received packet, the receiver entity discards the packet and sends an ACK packet with the current BSN. If the PSN value falls within the receiver entity's sliding window, the receiver entity updates the Sequence Number Bitmap by setting the bit at location (PSN-BSN) to 1. If the bit at location (PSN-BSN) was already 1, the packet is discarded; otherwise the packet is delivered to the ULP of the receiver entity and a cumulative ACK counter is incremented. If the PSN of the received packet is equal to BSN of the received packet, the receiver entity updates the BSN to be equal to the next highest PSN that has not been received.

Note that, because the packets are tracked according to bitmaps, the sliding windows are configured to allow the entities to keep track of packets received and/or acknowledged out-of-order within the respective sliding window. Thus, as shown, although packets represented by bits 3 and 4 may be sent by entity A before the packets represented by bits 0, 1, and 2, the packets represented by bits 3 and 4 may be received and/or acknowledged before the packets represented by bits 0, 1, 2 in the TX sliding window 410.

Network congestion may be detected by monitoring packet retransmission and/or packet round-trip latencies. To perform congestion control, a size of the one or more sliding windows may be adjusted. For example, if congestion is high, it may take longer for all packets within the TX sliding window 410 to be received and/or acknowledged by entity B. As such, to reduce congestion, the number of outstanding packets in the network may be reduced by decreasing the size of the sliding window 410. In addition to or as alternative to changing the size of the sliding window, a retransmission timer expiry value may be adjusted in response to network congestion status. For example, retransmitting less frequently might reduce network congestion.

Figure 5:
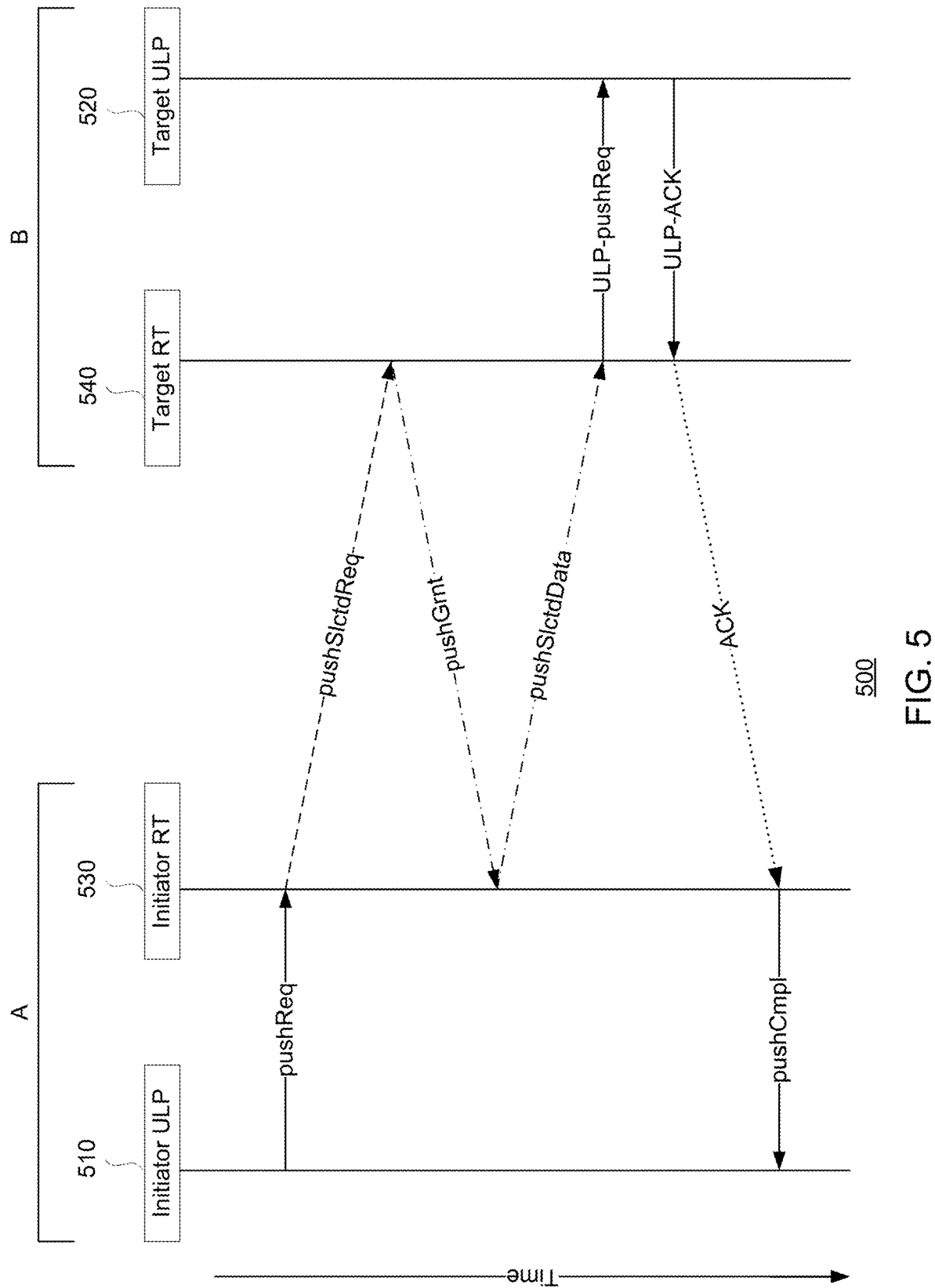
FIG. 5 is an example timing diagram of a solicited push transaction according to aspects of the disclosure.

The communication protocol system 300 of FIG. 3 may support various transactions, including both pull and push transactions. The communication protocol system 300 of FIG. 3 may be configured to perform the transactions using an initiator-target approach, where an "initiator" is the entity that requests a transaction, and a "target" is the entity that responds to the request. Such a transaction may involve multiple packets to be transmitted between the initiator and target entities, thus the initiator and the target entities may be both sender and receiver of packets in the transaction and may keep track of packets and/or acknowledgments using TX and/or RX sliding windows as described with reference to FIG. 4. FIG. 5 shows an example timing diagram for a push transaction according to aspects of the technology. It is noted that pull transactions may be similarly constructed without the push grant (PushGrnt) feedback. The push transaction depicted in FIG. 5 is a solicited push request. Other types of push transactions, such as unsolicited push requests, may be similarly constructed without the push grant (PushGrnt) feedback. The example timing diagrams of FIG. 5 may be implemented by two entities in a network, such as entities A and B over connection 110 of FIG. 1, for example by processors 220 and 270 of FIG. 2.

FIG. 5 shows a timing diagram 500 for a push request, such as a solicited push transaction. As shown, the push transaction is performed by various communication protocol layers of both the initiator entity and the target entity. For example, entity A may be the initiator entity, and initiator ULP 510 and initiator RT 530 may be communication protocol layers configured as upper layer protocol 310 and reliable transport protocol layer 330 of FIG. 3, respectively. Entity B may be the target entity, and target ULP 520 and target RT 540 may be communication protocol layers configured as upper layer 320 and reliable transport protocol layer 340 of FIG. 3, respectively.

As depicted in FIG. 5, a push request ("pushReq") may originate from the initiator entity A at the initiator ULP 510, which may be sent to the initiator RT 530. At this stage, the initiator RT 530 only sends a request to the target entity B, for instance over the connection 110, which may or may not be granted by the target entity B. This request and grant process or "solicitation" process may be performed by the respective RTs, which for example may be performed by their respective solicitation sublayers. Thus, the initiator RT 530 is shown sending a push request ("pushSlctdReq") to the target RT 540, and the target RT 540 may decide whether and/or when to grant the pushSlctdReq. In some examples, entity B may limit the total number of outstanding granted pushSlctdData to prevent incast to entity B that causes congestion in the network. If and when the target RT 540 grants the request, the target RT 540 may send a push grant ("pushGrnt") back to the initiator RT 530. Once the initiator RT 530 receives the pushGrnt, the initiator entity A may then push solicited data ("pushSlctdData") onto the target entity B, for instance over the connection 110. This may be performed by the respective RTs, thus the initiator RT 530 is shown pushing solicited data ("pushslctdData") to the target RT 540. The data here is effectively solicited by the pushGrnt from the target RT 540. Once the data is received by the target entity B, the target RT 540 may request for the received data to be placed or stored at the target entity B and does so by sending a pushReq to the target ULP 520. In response, the target ULP 520 may place or store the received data, and then sends an acknowledgment message ("ULP-ACK") to the target RT 540 acknowledging that the received data has been placed or stored according to the pushReq. For reliable transport, the target entity B sends an acknowledgment message ("ACK") to notify initiator entity A of the receipt and placement of the pushed data, for instance over the connection 110. This is performed by the respective RTs, thus as shown the target RT 540 sends the ACK message to the initiator RT 530. Once the ACK message is received by the initiator RT 530, the initiator RT 530 may send a push complete message ("pushCmpl") to initiator ULP 510 to notify that the data packet has been received and placed by the target entity.

As described with reference to FIG. 1, the initiator entity A and the target entity B may communicate with each other by transmitting packets. Thus, the pushSlctdReq, pushGrnt, pushslctdData and ACK may each be a packet transmitted over the connection 110. Further as described with reference to FIG. 4, reliable transport packets may be tracked by sliding windows. As such, the pushslctdData packet may be part of a data TX sliding window kept by entity A (indicated by dash dot line). The pushGrnt packet may be part of a data TX sliding window kept by entity B (indicated by dash dot line), and the pushSlctdData packet may be part of a data TX sliding window kept by entity A (indicated by dash dot line). For reliable transport, the ACK packet sent by entity B may reference the PSN of the pushSlctdData, which entity A may keep track of using the data TX sliding window. Likewise, though not shown, entity A may send ACK for the pushGrnt packet, which entity B may keep track of using its data TX sliding window, and entity B may send ACK for the pushSlctdReq, which entity A may keep track of using its request TX sliding window. However, acknowledgment messages such as the ACK packet shown (indicated by dot line) are not reliable transport packets, and thus may not be part of any sliding window at the sender entity B.

As illustrated by FIG. 5, the solicited push transaction allows an initiator entity to solicit a grant to send data from a target entity before actually sending the data. As such, the target entity may have control over the incoming data, which may be especially helpful when multiple initiator entities are attempting to push data onto the target entity, and also if the pushed data is large or if the network is congested. Since incast congestion may be caused by packets not being delivered to the receiver as fast as transmitted, and/or by multiple entities attempting to send packets simultaneously to the same entity, such a solicitation process may reduce incast congestion.

Figure 6:
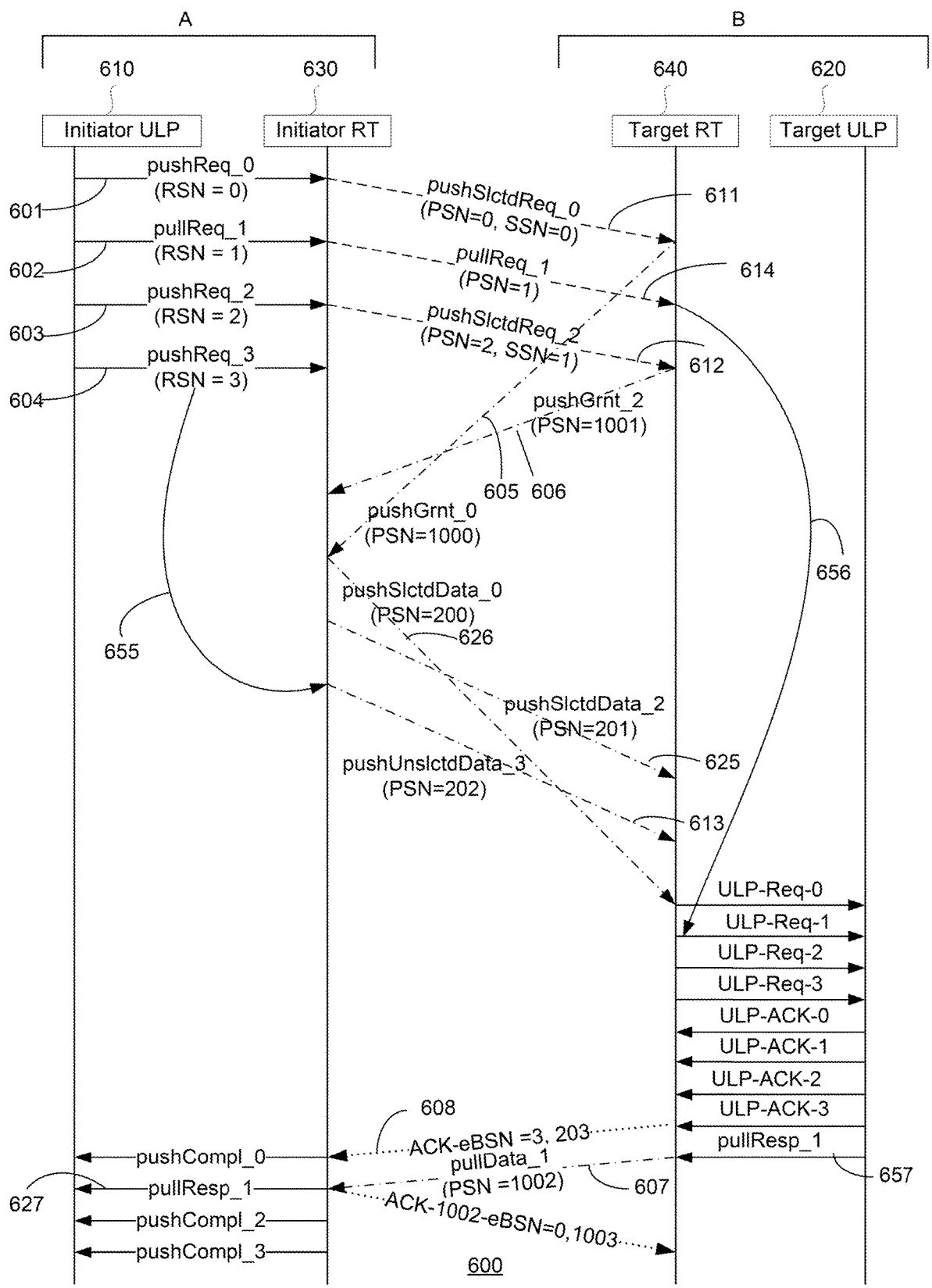
FIG. 6 is an example timing diagram of transactions according to aspects of the disclosure.

It is noted that other types of the requests, such as an unsolicited push request and/or pull request may also be utilized in the communication protocol system, as shown in FIG. 6, with different feedback mechanisms. For example, an unsolicited push request does not require a pushGrnt from the target entity to send the push unsolicited data. Similarly, a pull request does not need a pull grant from target RT. Instead, the target RT may then send the pull request to the target ULP to request permission. The target ULP may then send an acknowledgment message ("ULP-ACK") to the target RT acknowledging the pull request, as well as a pull response ("pullResp") instructing the target RT to pull the requested data. In response to the pull request, the target RT may pull the requested data ("pullData"), and send the pulled data to the initiator RT, for instance over the connection 110. Once the requested data is received by the initiator RT, the initiator RT may send a pullResp to the initiator ULP so that the initiator ULP may place or store the received data packet.

Thus, the communication protocol system may be configured to perform both of the solicited push transactions and/or the unsolicited push transactions. Where the communication protocol system is configured to perform both of the push transactions, the system may be configured to determine which push transaction to use based on one or more factors. For instance, whether a push request should be sent as a solicited or unsolicited request may be determined by the initiator RT. The initiator RT may determine whether to send a solicited push request or an unsolicited push based on a length of the push request from the initiator ULP. As an example, if a push request requires a large amount of data to be pushed, such as meeting a predetermined size threshold, a solicited push request may be used to make sure that the large request does not cause congestion; otherwise an unsolicited push may be used. As another example, whether to use solicited request or unsolicited push may be based on network conditions, such as level of congestion, where a solicited request may be used when congestion meets a predetermined threshold level.

FIG. 6 shows an example timing diagram for ordered transactions over a connection according to aspects of the technology. The example timing diagrams of FIG. 6 may be implemented by two entities in a network, such as entities A and B over connection 110 of FIG. 1, for example by processors 220 and 270 of FIG. 2.

As depicted in FIG. 6, various transactions, such as the pull and push transactions, may be performed by various communication protocol layers of both the initiator entity and the target entity. For example, entity A may be the initiator entity and initiator ULP 610 and initiator RT 630 may be communication protocol layers configured as upper layer protocol 610 and reliable transport protocol layer 630 of FIG. 6, while entity B may be the target entity and target ULP 620 and target RT 640 may be communication protocol layers configured as upper layer protocol 620 and reliable transport protocol layer 640 of FIG. 6.

Referring to the timing diagram 600, a number of requests may originate from the initiator entity A, including pull requests such as pullReq_1, shown as communication path 602, and push requests such as pushReq_0, pushReq_2, and pushReq_3, shown as communication paths 601, 603, 604. As described above, these requests may be sent by the initiator ULP 610 to the initiator RT 630. Once the initiator RT 630 receives these requests, initiator RT 630 may optionally determine whether the push requests should be sent as solicited or unsolicited. Thus, in this example, the initiator RT 630 may determine that pushReq_0 and pushReq_2 are to be sent as solicited, while pushReq_3 is to be sent as unsolicited. The initiator RT 630 may then send these pull and push requests to the target RT 640, for example over the connection 110.

The requests may be sent by the initiator ULP 610 in a particular order as indicated by the Request Sequence Numbers ("RSN"), which may be assigned by the initiator RT 630, so as to track the transaction orders. In some instances, the initiator RT 630 may also assign Solicited Sequence Numbers ("SSN") specifically to solicited push requests, which may be an incremental number as shown. When the requests are sent as packets between two entities, the requests may be assigned with a sequence of numbers in ascending order according to the order of the RSN. Thus, as shown, the requests may be assigned PSNs within one or more TX sliding windows maintained by initiator entity A according to the RSNs. For example, pushSlctdReq_0, shown as a communication path 611, is assigned PSN=0, pullReq_1, shown as a communication path 614, is assigned PSN=1, pushSlctdReq_2, shown as a communication path 612, is assigned PSN=2 within a request TX sliding window of entity A (indicated by dash lines pointing towards B). Note that since pushReq_3 from the initiator ULP 610 does not require solicitation, there is no corresponding pushUnslctdReq being sent between the RTs. While RSNs and SSNs may be known to the ULPs, the PSNs may be unknown to the ULPs but only used by the RTs in packets.

In response to the solicited push requests, push grants may be sent by the target RT 640 to the initiator RT 630 in the order of the received requests, such as pushGnt_0 and pushGnt_2, shown as communication paths 605, 606 respectively. The push grants may be assigned with PSNs in ascending order within one or more TX sliding windows maintained by the target entity B according to the same order as the RSNs of the push requests. For example, pushGrnt_0 is assigned PSN=1000 and pushGrnt_2 is assigned PSN=1001 within a data TX sliding window of entity B (indicated by dash dot lines pointing towards A). However, the push grants may not be received in the same order by the initiator RT 630 as the order of transmission for the push requests. Thus, as shown, pushGrnt_2 is received by the initiator RT 630 before the pushGrnt_0. In this regard, the reorder engine 256, 296 may assist resembling the order of the requests prior to sending to ULPs. Details of the reordering operations and the retransmission operations will be described below with reference to FIG. 7.

Nonetheless, the initiator RT 630 may determine the correct order of the push grants based on their respective RSNs and push the data packets based on that order. Such order may be determined by performing a lookup operation in the reorder engine to determine the correct order. As such, although pushGrnt_2 was received by the initiator RT 630 before pushGrnt_0, the initiator RT 630 may first push the data solicited by pushGrnt_0 with pushSlctdData_0 and then push the data solicited by pushGrnt_2 with pushSlctdData_2 to target RT 640. The pushed data packets are also assigned PSNs in ascending order within one or more TX sliding windows maintained by initiator entity A according to the order of transmission. For example, pushSlctdData_0 is assigned PSN=200 and pushSlctdData_2 is assigned PSN=201 within a data TX sliding window of entity A (indicated by dash dot lines pointing towards B shown as the communication paths 626, 625 respectively). Note that the pushReq_3 does not require a grant, thus as indicated by the curved arrow 655 skips directly to pushUnslctdData_3, shown as the communication path 613, which pushes the unsolicited data. In this example, pushUnslctdData_3 is assigned PSN=202 also in the data TX sliding window of entity A.

Target RT 640 receives the requests, and then sends corresponding requests to the target ULP 620 in the order of ULP-Req-0-1-2-3, which is in the same order as the transmission order of the requests from the initiator ULP 610 shown at the top of the timing diagram 800. These ULP-Reqs ask the target ULP 620 for permission to pull data, or to place the pushed data at the target entity B. Note that the pull request pullReq_1 does not require a grant as described, thus as indicated by the curved arrow 656 skips directly to the ULP-Req. In response to the ULP-Reqs, the target ULP 620 may send acknowledgment ULP-ACKs to the target RT 640. In this ordered system, the ULP-ACKs are sent in the order of ULP-ACK-0-1-2-3, which is the same as the order of transmission for the requests from the initiator ULP 610.

Following the ULP-ACKs, with respect to the push transactions, ACKs acknowledging the data packets (or data acknowledgments) are then sent by target RT 640 to initiator RT 630 to notify the safe receipt and placement of the reliable transport data packets. As an example, ACK-eBSN=3, 203, shown as the communication path 608, is sent by entity B to notify entity A that all request packets up to PSN=3 and all data packets up to PSN=203 have been received and placed. Once the ACK is received, initiator RT 630 may send a completion message pushCompl_0 to initiator ULP 610. Further, in some instances acknowledgment packets may be opportunistically piggybacked on other reliable transport packets. For example, the requests pushSlctdReq_0, pullReq_1, and pushSlctdReq_2, are reliable transport packets requiring an ACK, but these acknowledgments to requests (or request ACKs) are not explicitly shown in timing diagram 800 because they may be piggybacked on reliable transport packets such as pushGrnt_0 and pushGrnt_2.

Also following the ULP-ACKs, pull requests may also be responded to. Thus, as shown, the target ULP 620 may send a pullResp_1 instructing target RT 640 to pull the requested data. Target RT 640 then sends the pulled data to the initiator RT 630 with pullData_1. In this example, pullData_1 is assigned PSN=1002 within the same data TX sliding window of entity B as the pushGrnts (indicated by dash dot line pointing towards A). The initiator RT 630 then sends a pullResp_1, shown as the communication path 657, to the initiator ULP 610 so that the initiator ULP 610 may place or store the received data packet at entity A. After the data packet is placed or stored at entity A, an acknowledgment may be sent to notify entity B of safe receipt. Thus, as shown, ACK-1002-eBSN=0, 1003 is sent by entity A to notify entity B that the pullData_1 packet has been safely received.

In this ordered system, the completion messages received by the initiator ULP 610 near the bottom of timing diagram 600 are in the same order as the requests that were sent by initiator ULP 610 near the top of the timing diagram 600. This order is maintained on ULPs of both initiator and target entities, where the target RT presents requests to the target ULP in the same order as the initiator ULP sends requests to the initiator RT. This ordered system ensures that the requests are delivered once and only once over the connection. In contrast, there may not be ordering requirements between transactions going in different directions over the connection.

Figure 7:
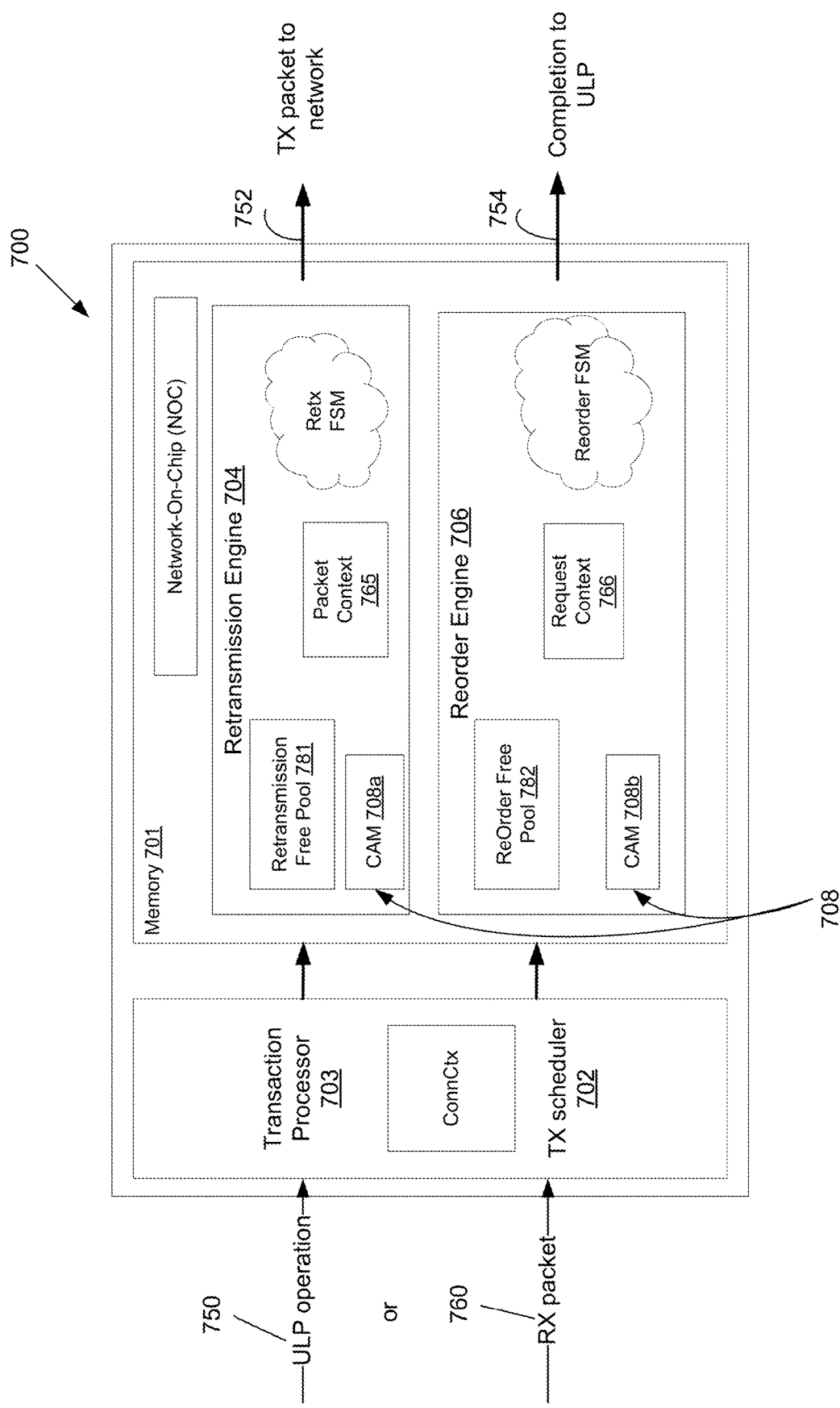
FIG. 7 is a block diagram of an example hardware architecture including a reorder engine and a retransmission engine according to aspects of the disclosure.

FIG. 7 depicts a CAM-based hardware architecture 700 that utilizes a content addressable memory (CAM) 708 (shown as 708a, 708b) to provide a look-up operation and an update operation for the data or packets transmitted therethrough. It is noted that the CAM-based hardware architecture 700 may be built in the initiator RT 530, 630 and/or target RT 540, 620 to provide the lookup and update operation. The CAM-based hardware architecture 700 includes one or more CAMs 708 that may provide look-up tables for data comparison during transmission.

In the example where the CAM-based hardware architecture 700 is utilized in the initiator RT 530, 630, during transmission, a request, such as a ULP operation shown by the arrow 750, from ULP, such as the initiator ULP 510, 610, may be transmitted through the CAM-based hardware architecture 700 in the initiator RT 530, 630. A transaction processor 703 in the CAM-based hardware architecture 700 may serve as a transmission scheduler (TX scheduler) 702 to process context, requests, data, or packets from the ULP operation 750, generating a command context per transaction to send to a reorder engine 706. The reorder engine 706 includes a content addressable memory (CAM) 708b that may mark, register and store data entries and information from the connection context in the content addressable memory (CAM) 708b. Each connection node maintains a connection context (connCtx) per connection and the connection context may be updated based on transactions so as to keep both nodes synchronized. Each data entry may be assigned with a plurality of sequence numbers, such as solicitation sequence numbers (SSNs) or request sequence numbers (RSNs) in an ascending order. The connection ID and some information of the data entries are then saved in the content addressable memory (CAM) 708b. It is noted that different SSNs or RSNs may be assigned to the data entries, based on the types of the connection context from the ULP operations 750. Thus, the content addressable memory (CAM) 708b in the initiator RT 530, 630 may identify and mark each data entry from the ULP operation 750 to be transmitted therefrom and save these data entries with the assigned numbers in the content addressable memory (CAM) 708b, which may later serve as a look-up table when the data is transmitted back from the target RT 540, 620.

Subsequently, the data entries may then transmit through the retransmission engine 704 so that the content addressable memory (CAM) 708a in the retransmission engine 704 may record and track the outstanding data, including packet sequence number (PSN) assigned from each data entries, in the retransmission engine 704. After the data entries from ULP operation 750 is marked, assigned, registered, tracked and recorded, the data entries may then transmit to network, as shown in the arrow 752, to the target RT 540, 620.

In another example, when data or packets are transmitted back from the target RT 540, 620 and received by the initiator RT 530, 630, as shown from by the arrow 760. The data may be transmitted to the transaction processor 703, for example the transmission scheduler (TX scheduler) 702, scheduled to be transmitted back to the initiator ULP 510, 610 as the final destination. Similar to the operation described above, the data/packet may then transmit through the reorder engine 706 to perform a look-up operation to ensure that the packets as received are in order. For example, the received data may transmit through the reorder engine 706 and compare the order of the received data with the order of the data entries saved in the content addressable memory (CAM) 708b. When the order of the received data matches the order saved in the content addressable memory (CAM) 708b, the data may then be transmitted to the initiator ULP 510, 610 the same order as requested, as shown by the arrow 754 to complete the data transmission. Thus, an update operation may then be performed to install or uninstall data entries in the CAM 708b. When the order of the received data match does not match the order saved in the content addressable memory (CAM) 708b, the content addressable memory (CAM) 708b may then provide the associated order information so that the received data may be reordered to match the original order prior to transmitting back to the initiator ULP 510, 610. Furthermore, the received data may also transmit through the retransmission engine 704 to ensure the related requests, feedbacks, acknowledges are received. If not, the retransmission engine 704 may request retransmission of the data to complete the communication transmission.

In one example, when a packet is received from ULP 510, 610, a packet sequence number (PSN) and request sequence number (RSN) is assigned to the packet. A free entry is obtained from a retransmission free pool 781 (retx_free_entry) in the retransmission engine 704, and/or from a reorder free pool 782 (rord_free_entry) in the reorder engine 706. Each data entry includes the information of the connection identifier (CID) with the associated PSN, RSN assigned for each given connection. The CAM 708a in the retransmission engine 704 is installed with the {CID, PSN} in the location of the retransmission free pool 781. The associated packet information is updated at the retransmission free pool 781 in a packet context structure formatted under packet context 765 configured in the retransmission engine 704. Similarly, the CAM 708b in the reorder engine 706 is installed with the {CID, RSN} at a location of the reorder free pool 782. The request information is updated at a location of the reorder free pool 782 in the request context structure under request context 766 configured in the reorder engine 706.

In one example, when an acknowledgment, such as the acknowledgment ACK-eBSN=3, 203, shown as the communication path 608 in FIG. 6, is received with a sequence number, a lookup operation is performed in the retransmission engine 704 to search information associated with the acknowledgment, such as the packet context including the identification information of the CID, PSN and other associated state of the acknowledgment. After the identification information is obtained, an update operation to install or uninstall data entries may be performed. For example, a deallocation operation may be performed in the CAM 708a when the acknowledge is received within a desired period of time with the desired order so that the data transaction is considered completed and ready to be deallocated from the CAM 708a. Thus, the data entries in the CAM 708a are updated to uninstall the CAM entry. In contrast, when an acknowledgment is not received within a timeout period, the packet context is looked up using the data entry previously saved in the CAM 708a and a retransmission of the packet may then be performed.

In another example when a Pull Request, such as pullReq_1 shown as the communication path 602 in FIG. 6, is performed, the Pull Response, such as pullResp_1 shown as the communication path 657 in FIG. 6, is sent back to the ULP 510, 610, is required to be in the requested order. Thus, the reorder engine 706 performs the ordering operation based on the RSN from the received packet of the Pull Response prior to sending back to the ULP 510, 610. Thus, the lookup operation performed in the CAM 708b of the reorder engine 706 associates Pull Response with the corresponding Pull Request. Once the Pull Responses are ordered, the ordered Pull Responses may be sent to the ULP and the data entry in the CAM 708b of the reorder engine 706 may be deallocated. Thus, the associated entry of the Pull Response and the corresponding Pull Request is also uninstalled in the CAM 708b of the reorder engine 706 and the data entry is added back to the reorder free pool 782.

Figure 8:
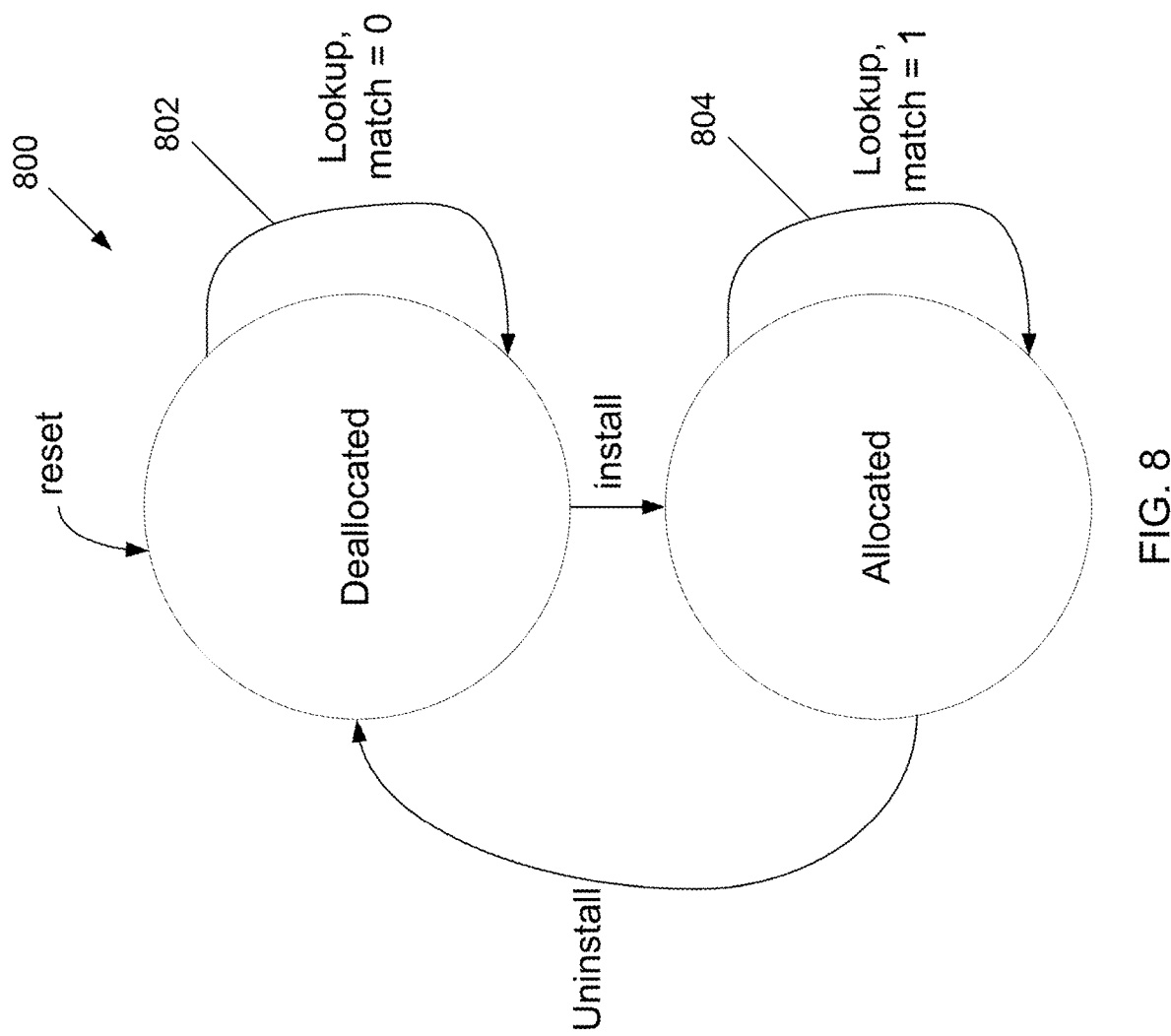
FIG. 8 is a sequence of operations for data entry updates input to a content addressable memory (CAM) according to aspects of the disclosure.

FIG. 8 depicts a flow chart 800 of performing a lookup operation and/or an update operation, including install/uninstall operations or other operations, in the CAM 708 in the retransmission engine 704 or the reorder engine 706. Typically, a single lookup operation or update operation can be performed at a time to the CAM 708 in the reorder engine 706 or in the retransmission engine 704. The total bandwidth available in the CAM 708 is shared among the lookup and update operations. In one example, after a lookup operation, if no matches are found in the CAM 708, as indicated by the loop 802, an install operation may be performed to register a data entry in the CAM 708, indicating a new data entry is installed and saved in the CAM 708. In another example, when a match is found after a look up operation, as indicated by the loop 804, it indicates that a transaction may be completed. A previously saved data entry is located in the CAM that matched with a newly received data entries, indicating the transaction of packet sending and receiving is completed. Thus, such data entries may be removed and uninstalled from the CAM 708. Thus, the data entries saved in the CAM 708 may be updated based on the install/ uninstall operation as performed to allocate and/or deallocate data entries in the CAM 708.

Figure 9:
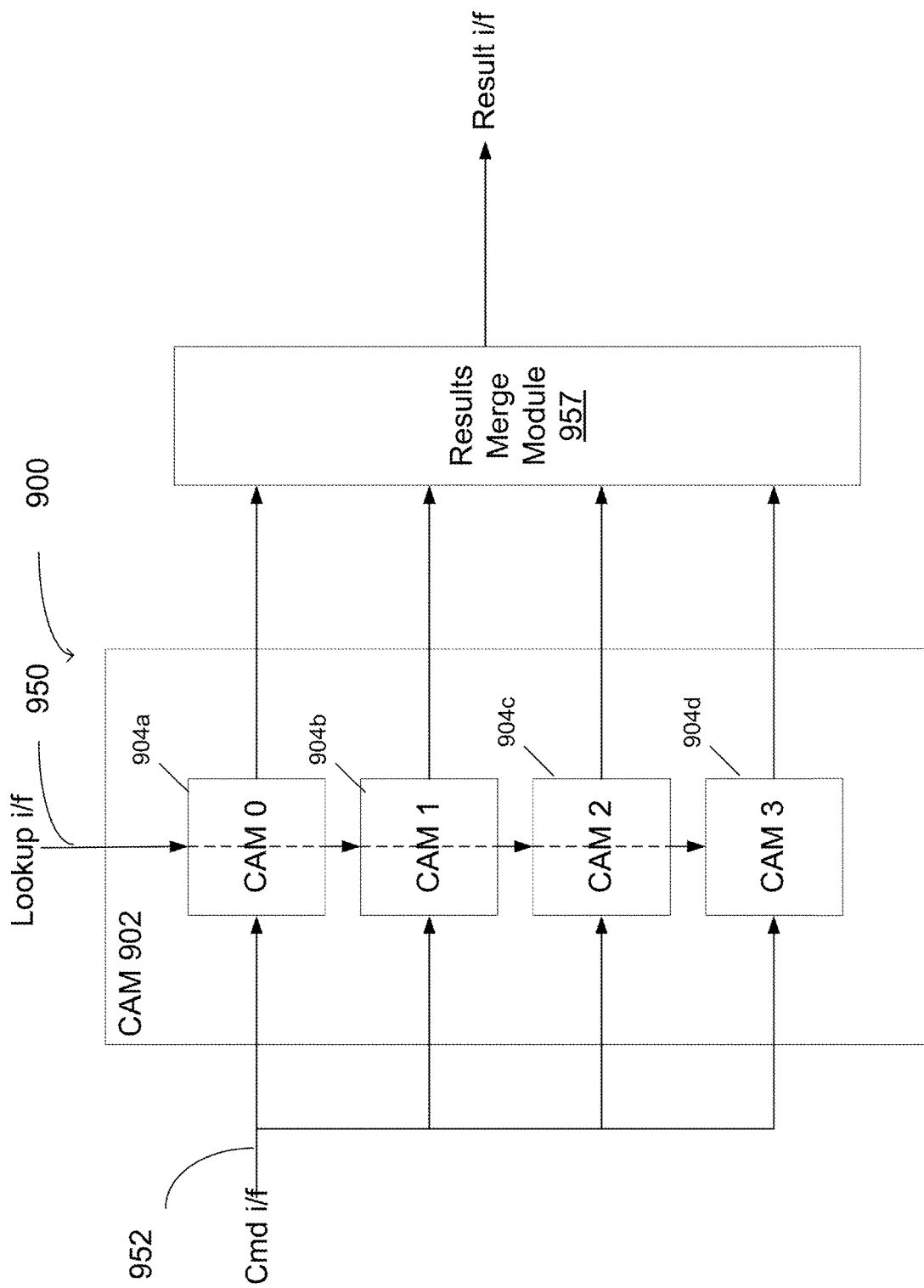
FIG. 9 is a schematic diagram of an example CAM module including a primary CAM partitioned to include a plurality of sub-CAMs according to aspects of the disclosure.

FIG. 9 depicts an example CAM module 900 including a primary CAM 902 logically partitioned to include a plurality of physical sub-CAMs 904a-d according to aspects of the disclosure. The primary CAM 902 may be the CAM 708 (FIG. 7) implemented in the retransmission engine 704 or the reorder engine 706. The primary CAM 902 may be logically partitioned into the plurality of physical sub-CAMs 904a-d in any desired numbers. Each sub-CAM 904a-d is similarly configured to perform lookup and update operations. Thus, each sub-CAM 904a-d is an individual searchable and executable partition that may perform a search operation, lookup operation or an update operation. The data entries may be saved in any suitable memory cells in the primary CAM 902. Thus, when a look-up operation is performed, the search keys is often utilized as the search terms search through the stored data of the primary CAM 902, including each of the sub-CAMs 904a-d as partitioned. Accordingly, the look-up operation is configured to be performed in each sub-CAM 904a-d partitioned from the primary CAM 902, as shown by the data flow path 950. The search results are then accessed and processed by a processor, such as the transaction processor 703 depicted in FIG. 7, to determine a subsequent command or operation to be executed. Once a subsequent operation, such as an update operation of install/uninstall operations, is determined, such operation may be performed in any of the sub-CAMs 904a-d, as shown by the data flow path 952. In this regard, several update operations may be performed in parallel, without compromising the lookup latency. Thus this provides for enhancing the CAM bandwidth, and increasing data transaction speed. The allocation logic of the primary CAM 902 spreads requests for install/uninstall operations across the sub-CAMs 904a-d, which increases the probability of executing parallel update operations and enhances data processing performance.

In one example, the results of each operation performed in each sub-CAM 904a-d may be combined to generate a final result. For example, a result merge module 957 may be updated and configured in the CAM module 900 to maintain the most up-to-date information saved in the primary CAM 902.

Figure 10:
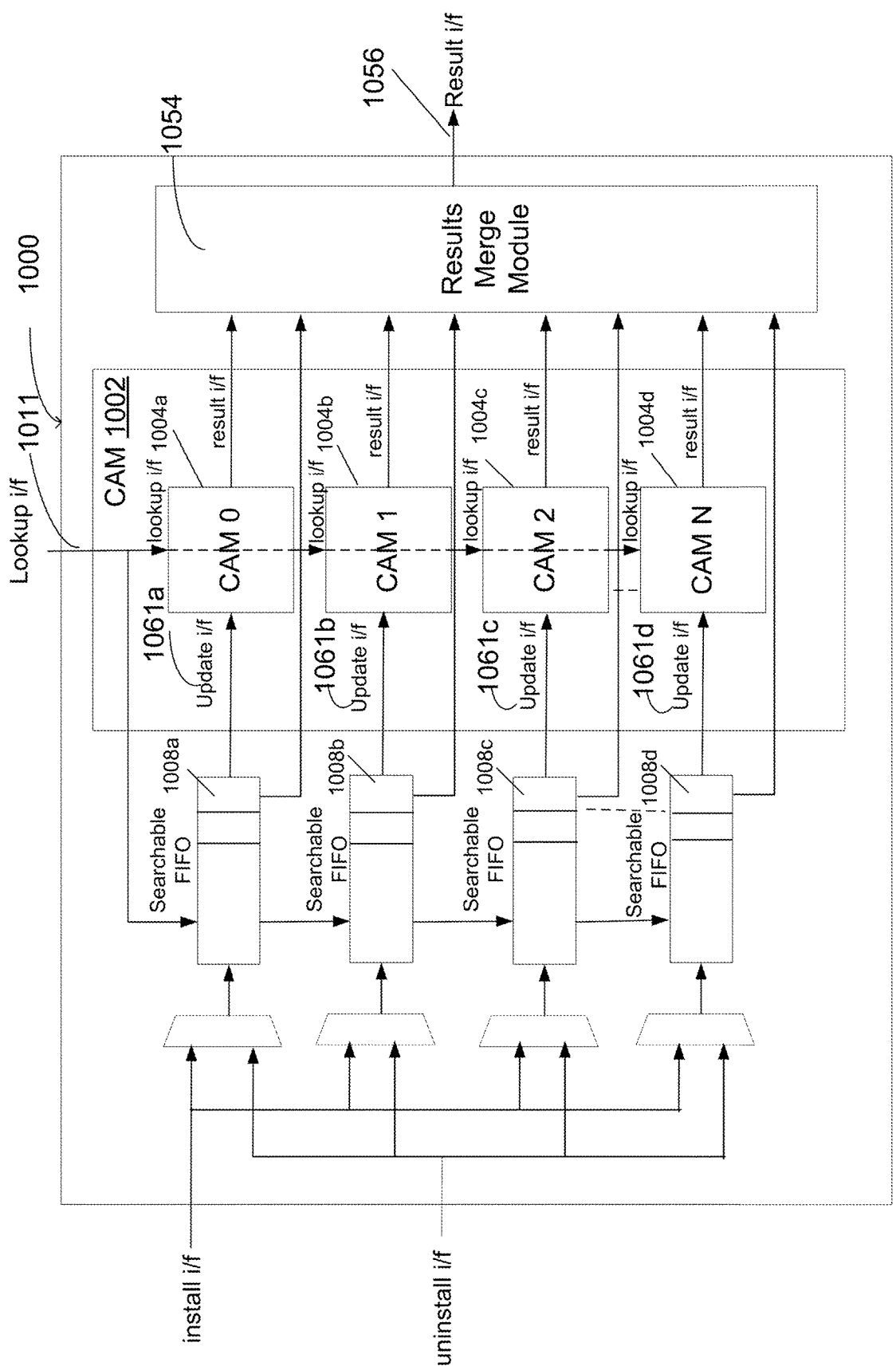
FIG. 10 is a schematic diagram of an example CAM module of a primary CAM with multiple interface configurations according to aspects of the disclosure.

FIG. 10 depicts an example CAM module 1000 including a primary CAM 1002 partitioned to include a plurality of sub-CAMs 1004a-d according to aspects of the disclosure. Similarly, the primary CAM 1002 may be the CAM 708a, 708b (FIG. 7) implemented in the retransmission engine 704 or the reorder engine 706. A plurality of first-in first-out (FIFO) interfaces 1008a-d may be configured and implemented in the CAM module 1000. Each FIFO interface 1008a-d is searchable and configured to be in communication with a corresponding sub-CAM 1004a-d. The FIFO interfaces 1008a-d have a lookup interface that may perform a key search operation, such as a lookup operation. The FIFO interfaces 1008a-d allow the processor 703 to communicate commands, operations, and data entries with the primary CAM 1002 while the primary CAM 1002 and/or the sub-CAMs 1004a-d simultaneously or synchronously perform other operations. Thus, the operations performed in each sub-CAM 1004a-d may be operated at different speeds, enabling parallel execution in each sub-CAM 1004a-d. Accordingly, the transactions processed in the primary CAM 1002 and/or the sub-CAMs 1004a-d, implemented in the retransmission engine 704 or the reorder engine 706, may achieve maximum throughput.

In one example, the FIFO interfaces 1008a-d buffer commands/operations written to the primary CAM 1002 and/or the sub-CAMs 1004a-d by the processor 703. The commands are executed by the primary CAM 1002 in the order presented. For example, the FIFO interface 1008a is a shift-based FIFO structure and queue update requests on a per sub-CAM basis. The resulting status and data are merged in a result merge module 1054 and presented at a result interface 1056 that is readable by the processor 703. The FIFO interfaces 1008a-d operate synchronously with each of the sub-CAMs 1004a-d so as to allow the processor 703 to communicate with each sub-CAMs 1004a-d in a timely manner without unnecessary delay.

In one example, when a lookup operation is performed, the lookup request for the primary CAM 1002 is connected and transmitted to each of the sub-CAMs 1004a-d for searching, as indicated by the flow path 1011. The search results of each of the sub-CAMs 1004a-d are then combined in the result merge module 1054 to generate a final CAM result. An update interface 1061a-d for each of the sub-CAMs 1004a-d is in communication with each of the FIFO interfaces 1008a-d to perform an update operation to the sub-CAMs 1004a-d when receiving a command from the processor 703. The FIFO interfaces 1008a-d participate in each lookup operation and provides the lookup bypass result to the results merge module 1054. In one example, the lookup bypass result is combined with the results from the sub-CAMs 1004a-d to generate the updated CAM result to be accessed and processed by the processor 703.

Figure 11:
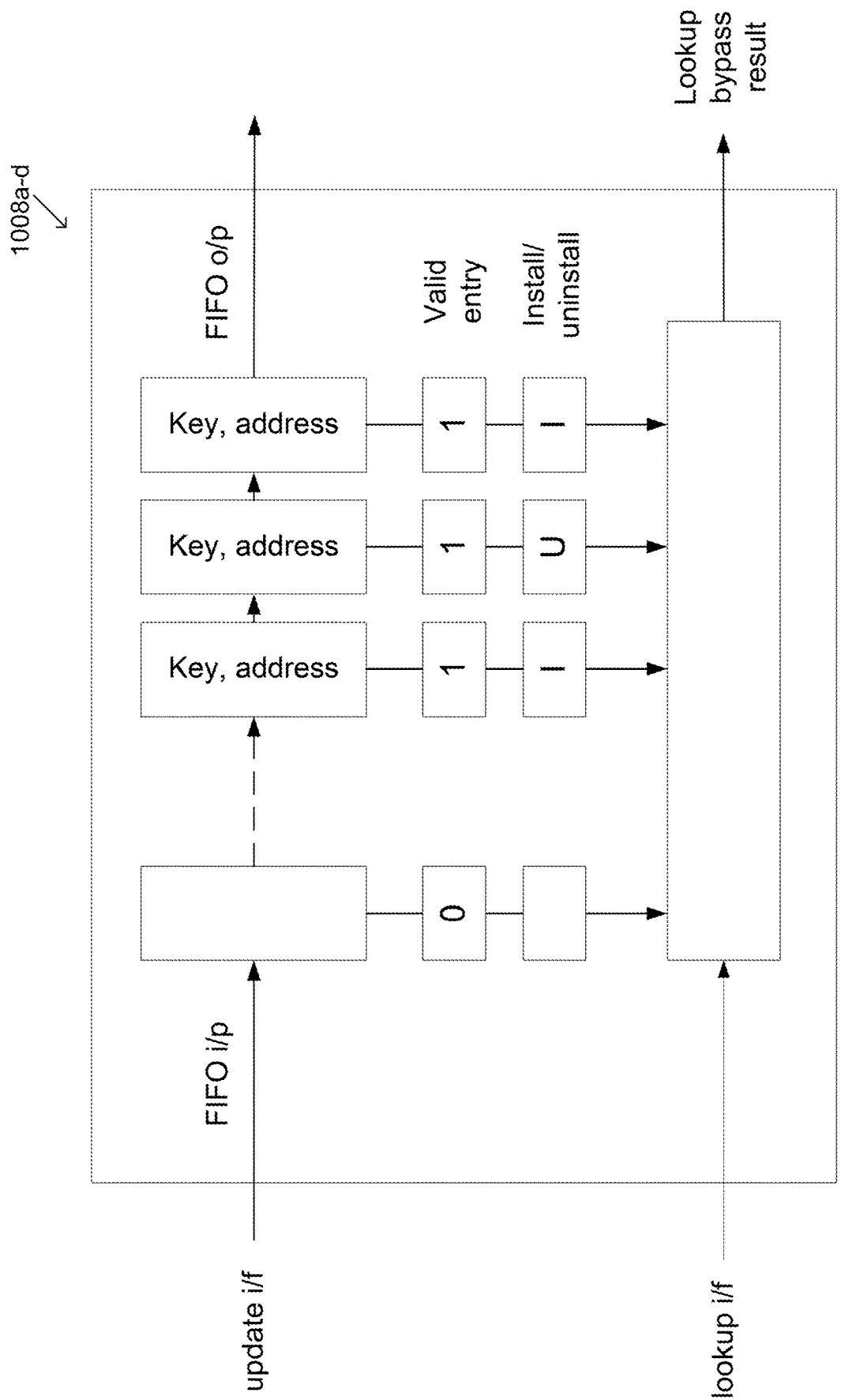
FIG. 11 is a schematic diagram of a searchable interface configured to be in communication with a primary CAM according to aspects of the disclosure.

FIG. 11 depicts a configuration of a FIFO interface 1008a-d configured to be in communication with a primary CAM for performing a lookup operation according to aspects of the disclosure. The FIFO interfaces 1008a-d queue up the search requests and shift out entries which are committed to the physical sub-CAMs. The FIFO interfaces 1008a-d compare each entry of the FIFO interfaces 1008a-d with the search argument on the lookup interface. The FIFO lookup result is based on the most recent update requests stored in the primary CAM 1002 so as to ensure that the FIFO lookup result is coherent for multiple install/uninstall updates to the same CAM entry. For example, when the lookup request, such as a data entry request, is input in FIFO interface 1008a-d and a match, such as an address match or a search key match, was found and associated with the address or keys stored in the primary physical CAM, an install or uninstall operation may be determined to be performed when the FIFO entry was an install or uninstall operation.

Figure 12:
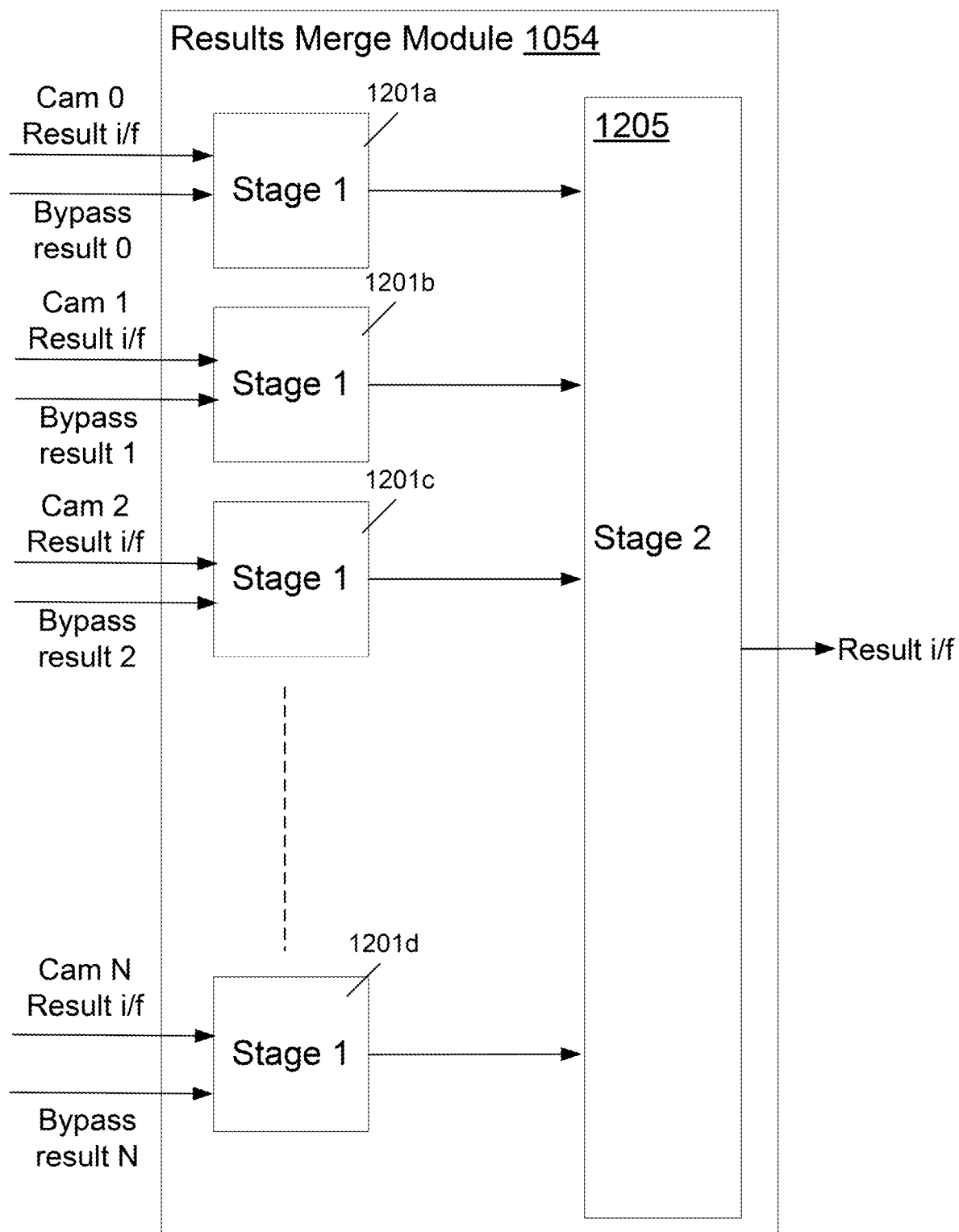
FIG. 12 is a schematic diagram of a result merge module in communication with the plurality of sub-CAMs according to aspects of the disclosure.

FIG. 12 is a configuration of the result merge module 1054 that is configured to be in communication with the plurality of sub-CAMs partitioned from the primary CAM 1002 according to aspects of the disclosure. In one example, the result merge module 1054 may perform a two-stage merge operation to generate a final CAM result. For example, the search results from each sub-CAMs 1004a-d may be first processed and merged in a first merge stage module 1201a-d on per sub-CAM basis. Subsequently, each merged result from each first merge stage module 1201a-d is then processed and merged in a second merge stage module 1205 to generate a final CAM result, including results from all of the sub-CAMs 1004a-d. In one example, different operations/actions may be performed and processed at the first and the second merge stage module 1201a-d, 1205. For example, the first merge stage module 1201a-d may update the search result in sub-CAMs 1004a-d or remove the search result in sub-CAMs 1004a-d if a bypass result was an uninstall operation. The second merge state module 1205 may further process the search results transmitted from the first merge stage module 1201*a-d*.

Figure 13:
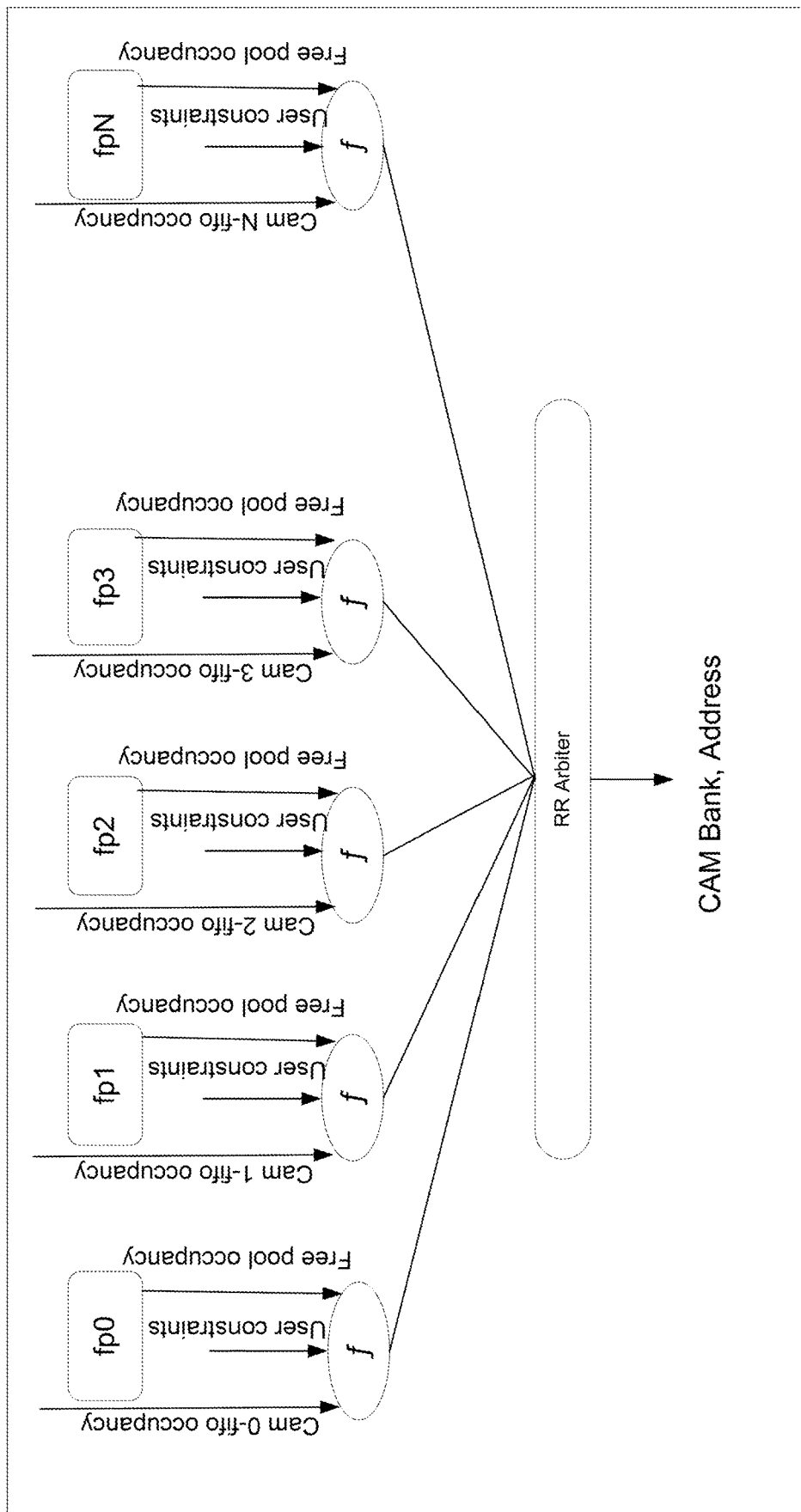
FIG. 13 is a flow diagram for selecting a sub-CAM for data allocation/deallocation utilizing a sub-CAM selection logic configured in the sub-CAM according to aspects of the disclosure.

FIG. 13 depicts a sub-CAM selection logic of a CAM free pool on a per sub-CAM basis according to aspects of the disclosure. The CAM free pool (fp 0-3) may be the retransmission free pool 781 or reorder free pool 782 described above with reference to FIG. 7. Multiple factors, such as searchable FIFO occupancy, available free pool entries or user constraints on per sub-CAM basis, are taken into consideration when allocating data entries and/or performing operations in the retransmission free pool 781 or the reorder free pool 782. Accordingly, some operations, such as install operations or uninstall operations, may be spread evenly across each of the sub-CAMs. Thus, when an update operation is determined to be performed by the processor 703, the sub-CAM selection logic may assist deciding a proper available sub-CAM for performing the update operation. The sub-CAM selection logic configured in each sub-CAM may perform a round robin (RR) arbitration across the qualified sub-CAMs to install a given entry as depicted in FIG. 13. Round robin (RR) arbitration is a scheduling scheme which gives to each request its share of using a common resource for a limited time or data elements. Thus, round robin arbitration allows each request a substantial equal share of the time in accessing the sub-CAMs or limited processing resource in a predetermined order. In each cycle of accessing each sub-CAM for performing an update operation, round robin (RR) arbitration utilizes its selection logic to check the availability, including the searchable FIFO occupancy, available free pool entries or user constraints of each sub-CAM to determine which respective sub-CAM is suitable or available to perform the update operation, with the condition that no lookup operation is processing in such sub-CAM.

Figure 14:
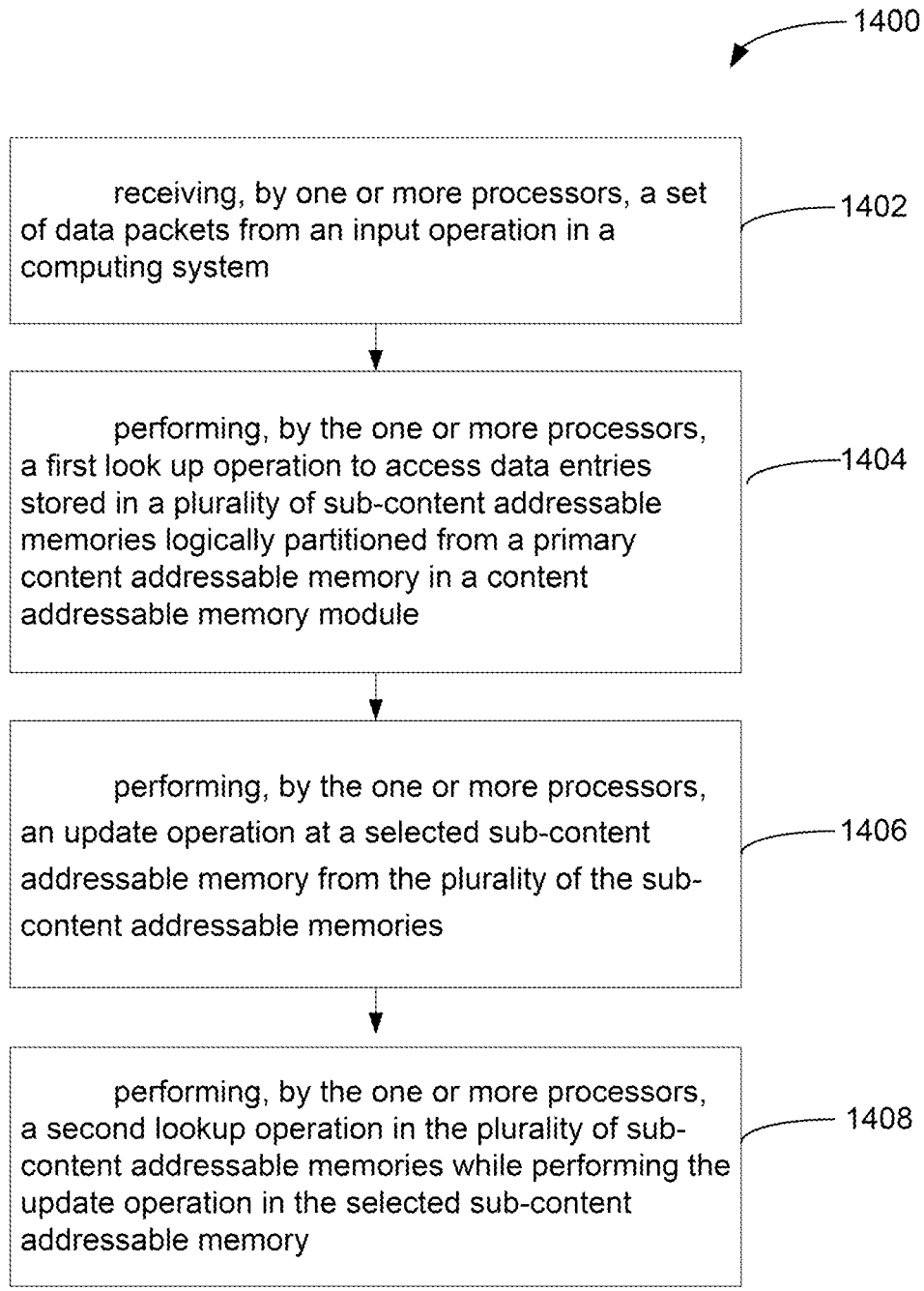
FIG. 14 is an example flow diagram according to aspects of the disclosure.

FIG. 14 depicts a flow chart for performing lookup and update operations in the CAM based architecture system. The method may be performed using the CAM based architecture system described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 14 illustrates one example method, variations of the methods may be performed, for instance as described above with reference to FIG. 1-13.

Referring to FIG. 14, an example flow diagram 1400 is shown illustrating transactions that may perform a look-up operation and an update operation synchronously in the CAM based reorder engine or retransmission engine. In the example depicted in FIG. 14, the CAM based reorder engine or retransmission engine is utilized in an initiator entity. The flow diagram 1400 may be performed by one or more entities in a network, such as by any of the entities A, B, C of FIG. 1, for example by processors 220 of FIG. 2. As mentioned above in reference to FIG. 2, the processors 220 may include processors on one entity, such as entity 110, or processors on multiple entities, such as on two or more of entities A, B, C, etc. As such, processors 220 may receive data, and perform reliable transport as described above with reference to FIGS. 1-13.

Referring to FIG. 14, in block 1402, a set of data packets from an input operation is received by one or more processors, such as the processors 704, in a computing system.

In block 1404, a first lookup operation is performed, by the one or more processors, to access data entries stored in a plurality of sub-content addressable memories logically partitioned from a primary content addressable memory in a content addressable memory module.

In block 1406, an update operation is performed at a selected sub-content addressable memory from the plurality of the sub-content addressable memories.

In block 1408, a second lookup operation may be performed, by the one or more processors, in the plurality of sub-content addressable memories while performing the update operation in the selected sub-content addressable memory.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A content addressable memory module in a computing system, comprising:
    a plurality of sub-content addressable memories logically partitioned from a reorder primary content addressable memory in the computing system;
    a plurality of sub-content addressable memories logically partitioned from a retransmission primary content addressable memory in the computing system;
    a plurality of searchable first-in first out (FIFO) interfaces configured to be in communication with respective sub-content addressable memories from the plurality of sub-content addressable memories of the reorder primary content addressable memory and the retransmission primary content addressable memory;
    one or more processors in communication with the content addressable memory module, the one or more processors configured to:
    receive a set of data packets;
    perform a lookup operation to access data entries stored in each of the sub-content addressable memories in one of the reorder primary content addressable memory and the retransmission primary content addressable memory; and
    perform an update operation at a selected sub-content addressable memory from the plurality of the sub-content addressable memories in one of the reorder primary content addressable memory and the retransmission primary content addressable memory.

2. The content addressable memory module of claim 1, further comprising:
    a result merge module in communication with the plurality of the sub-content addressable memories.

3. The content addressable memory module of claim 2, wherein the result merge module is configured to receive search results from each of the sub-content addressable memories after the lookup operation.

4. The content addressable memory module of claim 1, wherein the FIFO interface is configured to perform the lookup operation and the update operation synchronously.

5. The content addressable memory module of claim 1, wherein the one or more processors are further configured to:
when performing the lookup operation, compare the set of the data packets with the data entries in each of the sub-content addressable memories;
determine whether a data match is found between the set of the data packets and the data entries in the sub-content addressable memories.

6. The content addressable memory module of claim 5, wherein the one or more processors are further configured to:
perform an uninstall process during the update operation when the data match is found.

7. The content addressable memory module of claim 5, wherein the one or more processors are further configured to:
perform an install process during the update operation when no data match is found.

8. The content addressable memory module of claim 1, wherein the set of data packets comprises one or more push grant, push unsolicited data, pull response, pull request, or acknowledgement.

9. A method, comprising:
receiving, by one or more processors, a set of data packets from an input operation in a computing system;
performing, by the one or more processors, a first lookup operation to access data entries stored in a plurality of sub-content addressable memories logically partitioned from-a reorder primary content addressable memory and a retransmission primary content addressable memory in a content addressable memory module; and
performing, by the one or more processors, an update operation at a selected sub-content addressable memory from the plurality of the sub-content addressable memories of one of the reorder primary content addressable memory and the retransmission primary content addressable memory.

10. The method of claim 9, further comprising:
performing, by the one or more processors, a second lookup operation in the plurality of sub-content addressable memories while performing the update operation in the selected sub-content addressable memory.

11. The method of claim 9, wherein performing the first lookup operation further comprises:
transmitting the set of data packets through a plurality of FIFO interfaces in communication with the plurality of sub-content addressable memories, each FIFO configured to be in communication with a respective sub-content addressable memory; and
comparing the set of data packets with the data entries stored in each of the sub-content addressable memories.

12. The method of claim 11, further comprising:
transmitting each preliminary search result from each of the sub-content addressable memories to a result merger module in the content addressable memory module; and
generating a final search result in the result merger module.

13. The method of claim 12, wherein transmitting each preliminary search result further comprises:
processing each preliminary search result from each of the sub-content addressable memories in a corresponding first merge stage module in the result merger module; and transmitting the processed preliminary search results from each of the first merge stage modules in a second merge stage module to generate the final search result.

14. The method of claim 13, further comprising:
determining if a data match is found between the set of the data packet with the data entries in the sub-content addressable memory.

15. The method of claim 14, further comprising:
performing an uninstall process during the update operation when the data match is found.

16. The method of claim 14, further comprising:
performing an install process during the update operation when no data match is found.

17. The method of claim 11, wherein the FIFO interfaces are configured to perform the lookup operation and the update operation synchronously.

18. The method of claim 9, wherein the set of data packets comprises one or more push grant, push unsolicited data, pull request, pull response or acknowledgement.

19. The method of claim 9, wherein the input operation is a Remote Direct Memory Access (RDMA) operation.

20. The method of claim 9, wherein: the first lookup operation and the update operation are performed synchronously in a plurality of sub-content addressable memories logically partitioned from one of a reorder primary content addressable memory and the retransmission primary content addressable memory in the content addressable memory module.

* * * * *